(12) United States Patent
Koga et al.

(10) Patent No.: US 6,900,576 B2
(45) Date of Patent: *May 31, 2005

(54) ELECTROSTATIC MICROACTUATOR METHOD OF ACTIVATING THE SAME, AND CAMERA MODULE

(75) Inventors: Akihiro Koga, Kanagawa-ken (JP); Toshikatsu Akiba, Chiba-ken (JP); Mitsunobu Yoshida, Kanagawa-ken (JP); Shunsuke Hattori, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/847,346

(22) Filed: May 18, 2004

(65) Prior Publication Data

US 2004/0212275 A1 Oct. 28, 2004

Related U.S. Application Data

(62) Division of application No. 10/243,677, filed on Sep. 16, 2002, now Pat. No. 6,781,281.

(30) Foreign Application Priority Data

Sep. 18, 2001 (JP) ........................................ 2001-283533

(51) Int. Cl.[7] ............................................... H02N 1/00
(52) U.S. Cl. ......................... 310/309; 318/116; 396/75; 348/374

(58) Field of Search ........................... 310/309; 318/116; 348/374; 359/823, 824; 396/75, 113, 661, 439

(56) References Cited

U.S. PATENT DOCUMENTS

| 6,531,804 B2 | 3/2003 | Kasahara et al. | 310/309 |
| 6,611,079 B2 | 8/2003 | Koga et al. | 310/309 |
| 2001/0028203 A1 | 10/2001 | Kasahara et al. | 310/309 |
| 2002/0036443 A1 | 3/2002 | Akiba et al. | 310/309 |
| 2002/0050764 A1 | 5/2002 | Koga et al. | 310/309 |
| 2003/0057802 A1 | 3/2003 | Koga et al. | 310/309 |

FOREIGN PATENT DOCUMENTS

| EP | 1 139 553 A2 | 10/2001 | H02N/1/00 |
| EP | 1 193 853 A2 | 4/2002 | H02N/1/00 |
| JP | 2001-346385 A | 12/2001 | H02N/1/00 |

OTHER PUBLICATIONS

Akihiro Koga, et al., "Electrostatic Linear Microactuator Mechanism for Focusing a CCD Camera", Journal of Lightwave Technology, vol. 17, No. 1, Jan. 1999, pp. 43–47.

*Primary Examiner*—Karl Eizo Tamai
(74) *Attorney, Agent, or Firm*—Oblon, Spivak, McClelland, Maier & Neustadt, P.C.

(57) ABSTRACT

An object of the present invention is to provide an electrostatic actuator that can be easily assembled and suitably mass-produced and that can implement requirements of both the steady, smooth and stable operation and the enhanced reliability. The present invention is also directed to a method of activating such an electrostatic actuator, and a camera module used with the same.

17 Claims, 22 Drawing Sheets

ELECTROSTATIC MICROACTUATOR METHOD OF ACTIVATING THE SAME, AND CAMERA MODULE

CROSS-REFERENCE TO RELATED APPLICATIONS

This application is a Divisional of U.S. patent application Ser. No. 10/243,677, filed Sep. 16, 2002 now U.S. Pat. No. 6,781,281, and is based upon and claims the benefit of priority from the prior Japanese Patent Application No. 2001-283533, filed on Sep. 18, 2001, the entire contents of which are incorporated herein by reference.

BACKGROUND OF THE INVENTION

The present invention relates to an electrostatic microactuator, a method of activating the same, and a camera module used with the same, and more particularly, it relates to an electrostatic microactuator electrostatically powered, assembled easily, and having improved smoothness, stability, and reliability in actuation, a method of activating such an electrostatic microactuator, and a camera module used with the same.

For recent years, a miniaturized linear actuator of more downsized design, precise operation and reduced cost has been increasingly needed for focal adjustment of a super-compact camera, for example. An example of a solution to such needs is an electrostatic actuator disclosed in Japanese Patent Laid-Open Publication H08-140367.

FIG. 27 is a schematic diagram showing a structure of the prior art electrostatic actuator.

As shown in FIG. 27, an electrostatic actuator 101 is comprised of a movable piece 102 and a couple of statical members 103a and 103b overlaid on the opposite sides of the movable piece. The statical members 103a and 103b have their respective two groups of branch pads connected to electrodes, and there are four groups of branch pads connected to electrodes A to D for the couple of the upper and lower statical members.

Branch pads in the statical members 103a and 103b, which are connected to corresponding ones of the electrodes A to D, are arranged at the same pitch with branch pads 104 of the movable piece 102, and all the branch pads are the same in width in both the statical and movable pieces. In the static pieces 103a and 103, however, the branch pads separately correlated with two of the electrodes (e.g., electrodes A and C) are alternately placed in an interlacing deployment. In addition to that, the branch pads of the upper and lower static pieces 103a and 103b are correlated with one another in a ½ out-of-phase pattern where the upper branch pads are deviated by a half of their respective width from their counterparts or the lower branch pads.

Applying high voltage to the electrode A, an electrostatic force (Coulomb force) developed between the electrode A and the branch pads 104 correlated with an electrode E causes the movable piece to be attracted by the upper statical member 103a (toward a position where the branch pads correlated with the electrodes A and E are aligned in phase). Then, switching the electrode supplied with the high voltage to the electrode B, the movable piece 102 is attracted by the lower statical member 103b (toward a position where the branch pads correlated with the electrodes B and E are aligned in phase). In this way, the succeeding switching of the electrodes as in a manner of A to B, B to C, C to D, and so forth enables the movable piece 102 to microscopically vertically vibrate and macroscopically laterally move (e.g., move to the right in FIG. 27 with one degree of freedom).

Supplying the high voltage to the electrodes in the reversed order as in A to D, D to C, C to B, and so forth enables the movable piece to move to the left in FIG. 27.

To implement such a way of the motion, the vertically juxtaposed statical members 103a and 103b must be under accurate control of the phases or the branched-electrode pattern, and the movable piece 102 must also have an accurately fabricated electrode pattern on both the opposite sides. This requires time consuming and complicated assembling task and accordingly leads to a cost increase, which are some of problems that must be overcome for a mass-production of such a high precision actuator.

Further, since the movable pieces in this electrostatic actuator vibrates with a relatively large amplitude between the juxtaposed statical members 103a and 103b to laterally move pitch by pitch, its microscopic movement is not satisfactorily smooth, and it is desirable to improve both the physical and operational mechanisms of the actuator.

SUMMARY OF THE INVENTION

The present invention is made to address the aforementioned disadvantages in the prior art. Accordingly, it is an object of the present invention to provide an electrostatic actuator that can be easily assembled and suitably mass-produced and that can implement requirements of both the steady, smooth and stable operation and the enhanced reliability, a method of activating the same, and a camera module used with the same.

According to an embodiment of the present invention, there is provided an electrostatic actuator comprising: a first statical member having an electrode array being comprised of at least three groups of activating electrodes periodically deployed in a first direction; a second statical member faced to the first statical member and having an electrode extending in the first direction; a movable piece provided between the first and second statical members, and a switching circuit applying a first voltage to cause a potential difference between at least one of the groups of the activating electrodes and the movable piece and also applying a second voltage to cause a potential difference between the electrode of the second statical member and the movable piece, the first voltage being applied to sequentially switch a destination of applied voltage from at least one of the groups of the activating electrodes to another in the first direction, the second voltage being intermittently applied while the first voltage is applied.

According to an anther embodiment of the present invention, there is provided an electrostatic actuator comprising: a first statical member having an electrode array being comprised of at least three groups of activating electrodes periodically deployed in a first direction; a second statical member faced to the first statical member and having a first electrode extending in the first direction and a second electrode extending in the first direction in almost parallel with the first electrode; a first movable piece provided between the first and second statical members, a second movable piece provided between the first and second statical members, and a switching circuit applying a first voltage to cause a potential difference between at least one of the groups of the activating electrodes and the first movable piece and also applying a second voltage to cause a potential difference between the first electrode and the first movable piece, the first voltage being applied to sequentially switch a destination of applied voltage from at least one of the groups of the activating electrodes to another in the first direction, the second voltage being intermittently applied_ while the first voltage is applied, and the switching circuit applying a third voltage to cause a potential difference between at least one of the groups of the activating electrodes and the second movable piece and also applying a fourth voltage to cause a potential difference between the second electrode and the second movable piece, the third voltage being applied to sequentially switch a destination of applied voltage from at least one of the groups of the activating electrodes to another in the first direction, the fourth voltage being intermittently applied while the third voltage is applied.

According to an anther embodiment of the invention, there is provided a camera module comprising: a imaging device; a electrostatic actuator, the electrostatic actuator including: a first statical member having an electrode array being comprised of at least three groups of activating electrodes periodically deployed in a first direction; a second statical member faced to the first statical member and having an electrode extending in the first direction; a movable piece provided between the first and second statical members, and a switching circuit applying a first voltage to cause a potential difference between at least one of the groups of the activating electrodes and the movable piece and also applying a second voltage to cause a potential difference between the electrode of the second statical member and the movable piece, the first voltage being applied to sequentially switch a destination of applied voltage from at least one of the groups of the activating electrodes to another in the first direction, the second voltage being intermittently applied while the first voltage is applied; and a lens mounted on the movable piece of the electrostatic actuator and inputting a optical information to the imaging device.

According to an anther embodiment of the invention, there is provided a camera module comprising: a imaging device; a electrostatic actuator including: a first statical member having an electrode array being comprised of at least three groups of activating electrodes periodically deployed in a first direction; a second statical member faced to the first statical member and having a first electrode extending in the first direction and a second electrode extending in the first direction in almost parallel with the first electrode; a first movable piece provided between the first and second statical members, a second movable piece provided between the first and second statical members, and a switching circuit applying a first voltage to cause a potential difference between at least one of the groups of the activating electrodes and the first movable piece and also applying a second voltage to cause a potential difference between the first electrode and the first movable piece, the first voltage being applied to sequentially switch a destination of applied voltage from at least one of the groups of the activating electrodes to another in the first direction, the second voltage being intermittently applied while the first voltage is applied, and the switching circuit applying a third voltage to cause a potential difference between at least one of the groups of the activating electrodes and the second movable piece and also applying a fourth voltage to cause a potential difference between the second electrode and the second movable piece, the third voltage being applied to sequentially switch a destination of applied voltage from at least one of the groups of the activating electrodes to another in the first direction, the fourth voltage being intermittently applied while the third voltage is applied; a lens mounted on the first movable piece of the electrostatic actuator and inputting a optical information to the imaging device; and a lens mounted on the second movable piece of the electrostatic actuator and inputting a optical information to the imaging device.

Appropriately configured according to the present invention, a movable piece, while being attracted and almost fitted onto a surface that has branch pads connected to a first electrode, is permitted to move, thereby restraining vertical vibration under strong attractive force, so as to attain the desired stable, smooth, and reliable operation.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIG. 2 is a plan view showing a deployment of branch pads connected to electrodes A to D in a first statical member 2a;

FIG. 19A is a cross-sectional view of the actuator taken along its longitudinal axis, FIG. 19B is its X—X cross-sectional view, and FIG. 19C is its Y—Y cross-sectional view;

DETAILED DESCRIPTION

In advance of detailing embodiments of the present invention, the basics of an electrostatic actuator will be explained first.

Figure 24:
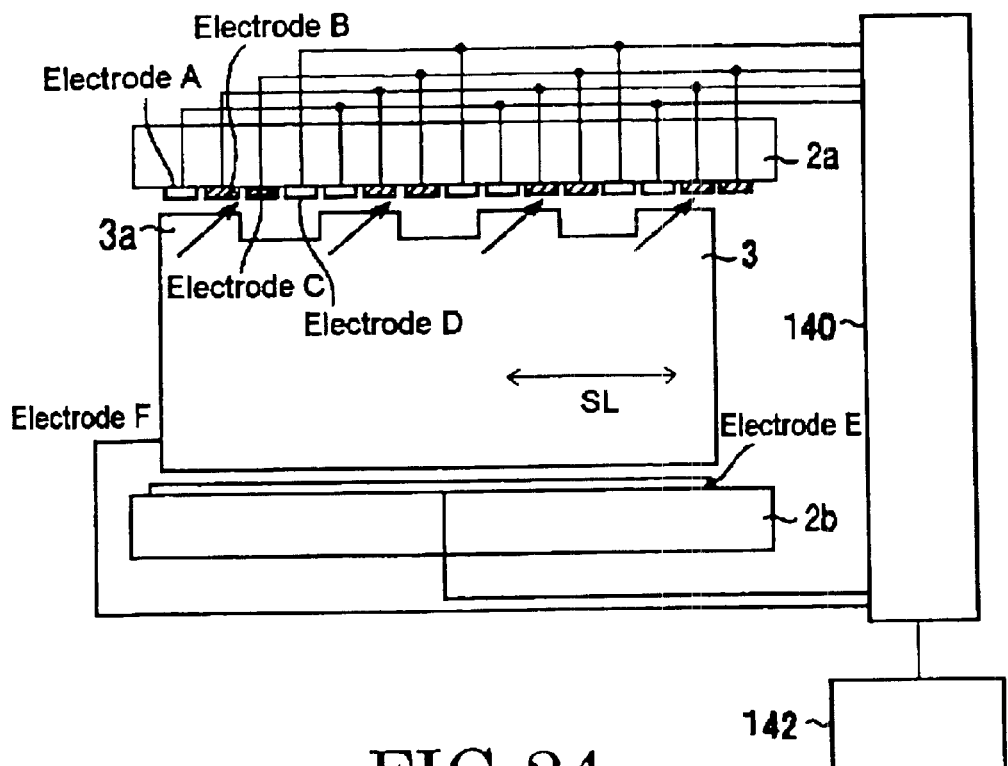
FIG. 24 is a schematic diagram showing a basic structure of the electrostatic actuator according to the embodiment of the present invention.

FIG. 24 is a schematic diagram showing a structure of a basic electrostatic actuator useful to understand the present invention.

The electrostatic actuator is comprised of first and second statical members 2a and 2b opposed to each other and a movable piece positioned between them and capable of sliding along a direction as denoted by an arrow SL.

The first statical member 2a has four groups of branch pads respectively connected to electrodes A to D while the second statical member 2b has a uniformly distributed electrode E in its surface. As will be recognized from the depiction in the figure, the four groups of branch pads correlated to the electrodes A to D are arranged in a stripe deployment where one from each group is succeedingly positioned one after another in the fixed order of A to D, for example, along a direction of advancement of the movable piece 3. A predetermined level of voltage is applied from a voltage supply 142 through a switching circuit 140 to all of each group simultaneously.

Figure 25:
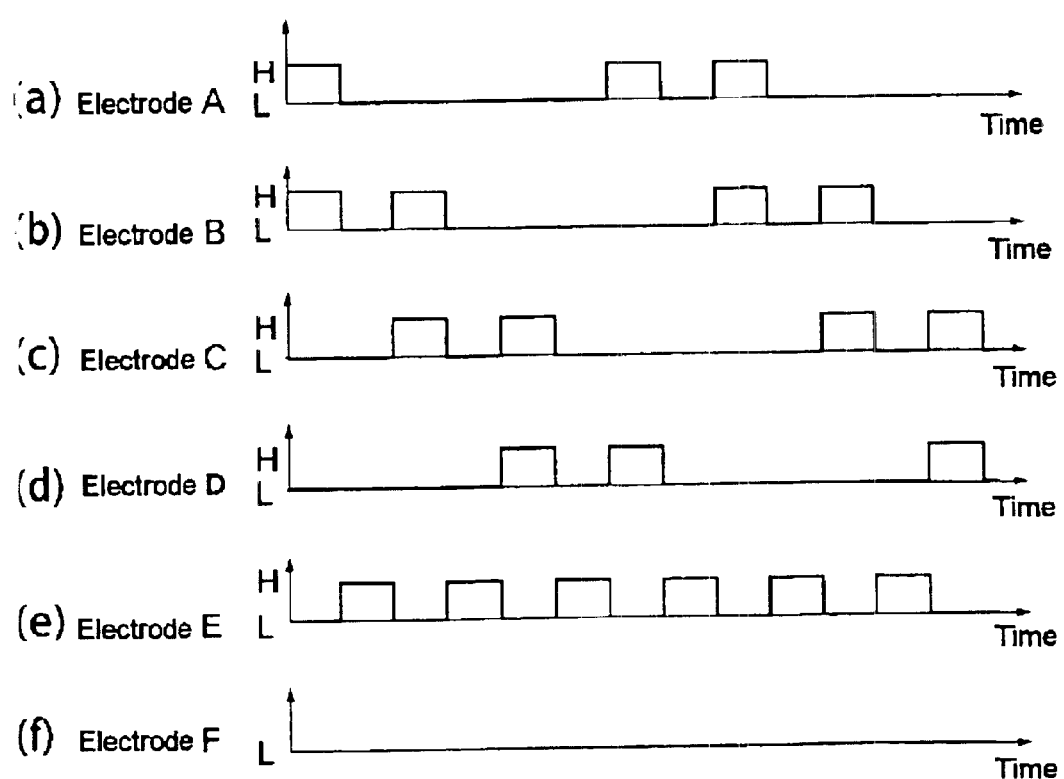
FIG. 25 is a timing chart illustrating waveforms of the voltage applied to electrodes by a switching circuit 140.

FIG. 25 is a timing chart illustrating waveforms of the voltage applied via the switching circuit 140 to the branch pads correlated to each of the electrodes.

Initially, an electrode F connected the movable piece 3 keeps its potential at a low level L, as shown in FIG. 25(f), while the electrodes A and B are supplied with voltage as shown in FIGS. 25(a) and 25(b). An electrostatic force between the electrodes A and B and the movable piece 3 causes the movable piece 3 to be attracted to the branch pads A and B respectively connected to those electrodes and almost fitted on the first statical member 2a. Then, as shown in FIG. 25(e), the switching circuit 120 switches its connection from the electrodes A and B to an electrode E so as to apply voltage to the electrode E, and the movable piece 3 leaves the branch pads A and B, or it is attracted by and towards the second statical member 2b.

After that, the switching circuit 140 switches its connection from the electrode E to the electrodes B and C so as to apply voltage to the branch pads B and C connected to those electrodes as shown in FIGS. 25(b) an 25(c), and an electrostatic force between the branch pads B and C and the movable piece 3 causes the movable piece 3 to be attracted by the first statical member 2a. Then, the switching circuit 140 switches its connection from the branch pads B and C to the electrode E so as to apply voltage to the electrode E as shown in FIG. 25(c), and resultantly, the movable piece 3 leaves the branch pads B and C, or it is attracted toward the second statical member 2b.

Next, the switching circuit 140 switches its connection from the electrode E to the electrodes C and D so as to apply voltage to the electrodes C and D as shown in FIGS. 25(c) and 25(d), and an electrostatic force between the electrodes C and D and the movable piece 3 results in the movable piece 3 being attracted by the first statical member 2a. Subsequently, the switching circuit 140 switches the connection from the electrodes C and D to the electrode E so as to apply voltage to the electrode E as shown in FIG. 25(e), the movable piece 3 leaves the electrode E, or it is attracted toward the second statical member 2b.

Furthermore, the switching circuit 140 switches the connection from the electrode E to the electrodes D and A to apply voltage to the electrodes D and A as shown in FIGS. 25(d) and 25(a), the resultant electrostatic force between the electrodes D and A and the movable piece 3 causes the movable piece 3 to be attracted by the first statical member 2a. Subsequently, the switching circuit 140 switches the connection from the electrodes D and A to the electrode E to apply voltage to the electrode E as shown in FIG. 25(e), and the movable piece 3 leaves the branch pads D and A, or it is attracted toward the second statical member 2b.

Repeating the aforementioned operation sequence enables the movable piece 3 to microscopically vertically vibrate and macroscopically laterally move along an extension of the branch pads in the first statical member 2a.

Figure 27:
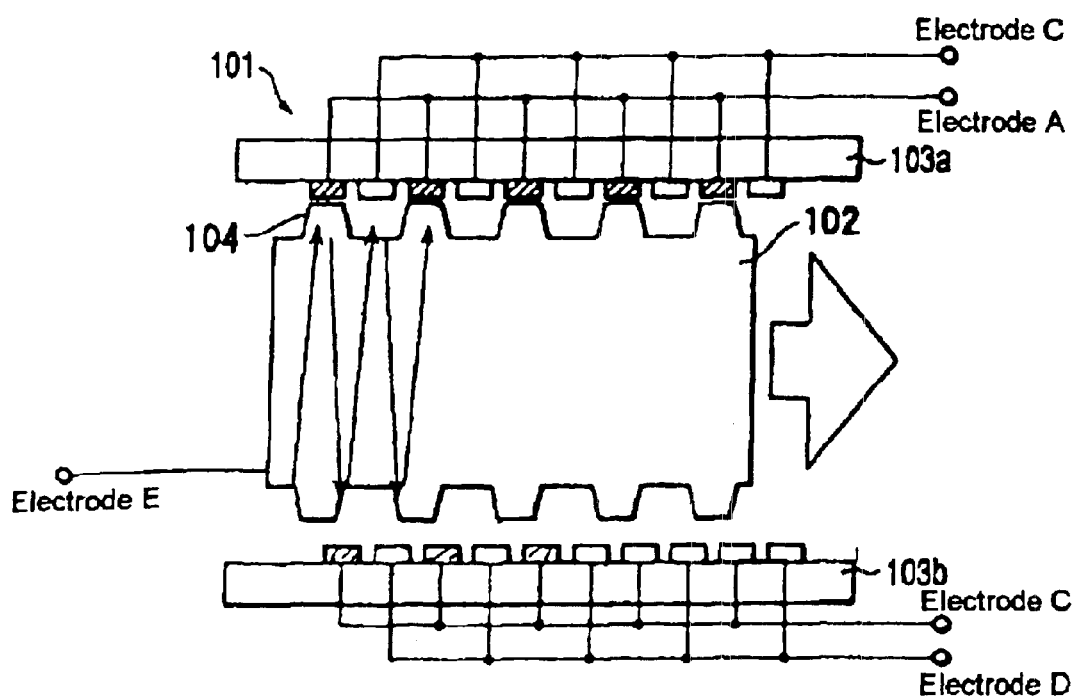
FIG. 27 is a diagram showing a structure of the prior art electrostatic actuator.

In the electrostatic actuator in FIG. 24, as has been described, the statical member 2b is provided simply with the uniformly distributed electrode E, which permits a linear motion. Thus, unlike the prior art electrostatic actuator having the electrodes in the stripe deployment in the vertically juxtaposed statical members 103a and 103b as shown in FIG. 27, a precise phase control is needless over the branched-electrode pattern. A positional relation between the couple of the statical members 2a and 2b does not have to be adjusted so precisely as in the prior art embodiment, and this leads to a time and labor saving for assembly and consequently brings about a cost reduction, so that a mass-productivity can be greatly enhanced.

Additionally, in the electrostatic actuator in FIG. 24, since voltage is applied alternately to the first and second statical members 2a and 2b, the movable piece 3 laterally moves while vertically vibrating.

Figure 26:
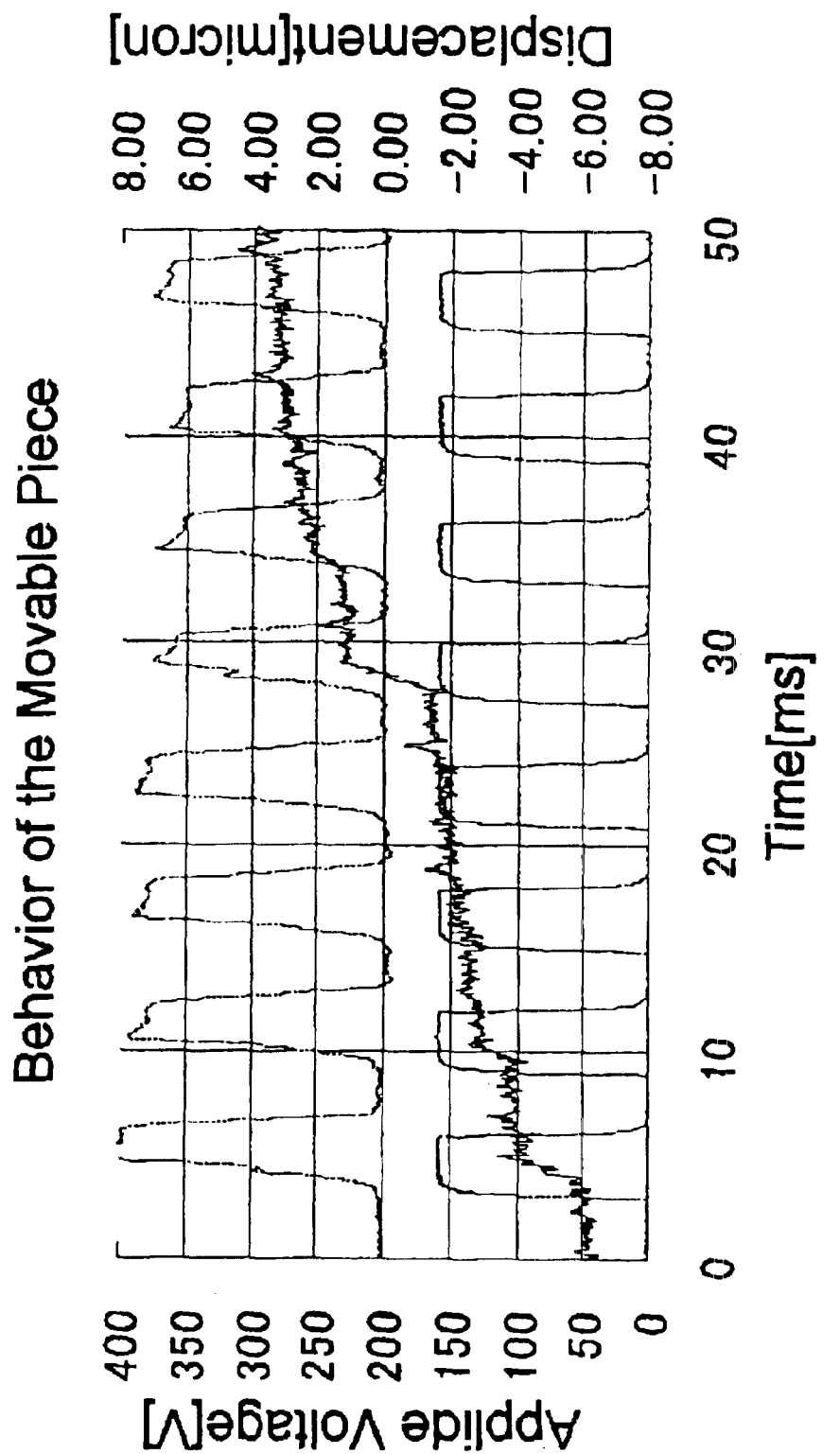
FIG. 26 is a graph showing measurements resulted from monitoring the motion of a movable piece in the electrostatic actuator shown in FIG. 24.

FIG. 26 is a graph showing measurements resulted from monitoring the motion of the movable piece in the electrostatic actuator in FIG. 24. The horizontal axis represents an elapse of time, and the vertical axis on the left represents voltage applied to the electrodes while the vertical axis on the right represents a displacement of the movable piece 3. Rectangles plotted in a lower half of the graph show a waveform of voltage applied to the electrodes while those in an upper half of the graph show a vertical displacement of the movable piece 3, and line extending from the lower left to the upper right in the graph also represents a displacement of the movable piece 3 in directions of its advancement (lateral directions).

In FIG. 26, the lateral displacement is plotted at a reduction scale of 1/10 to the vertical displacement. In other words, a lateral displacement is actually ten times as long as a vertical displacement indexed at the same graduation line along the vertical axis.

As can be seen in FIG. 26, each time a destination of the applied voltage is switched from one electrode or electrode pair to another, the movable piece 3 moves up or down while proceeding (in a lateral direction) a little bit. An amplitude of such vertical movement depends upon distance between the movable piece 3 and the juxtaposed statical members 2a and 2b, and it is much greater than a lateral displacement equivalent to a single pitch of the movable piece. The movable piece 3, while vibrating with a relatively great amplitude, laterally advances bit by bit. Moreover, the amplitude of the vertical vibration, although defined as the distance between the movable piece 3 and the two of the statical members 2a and 2b, is likely to vary due to manufacturing error.

Since the Coulomb force developed between the movable piece 3 and the statical members 2a and 2b is inversely proportional to the distance between those members that are raised to the second power, a continual variation in the distance between those components may always affect the attractive force between them, and the motive force for the attraction and displacement of the movable piece becomes unstable.

The inventors' attempt was to improve such drawbacks in the prior art, and they have successfully enhanced operational smoothness and stability to complete a technically refined electrostatic actuator.

Embodiments of the present invention will be described in more detail.

(First Embodiment)

Figure 1:
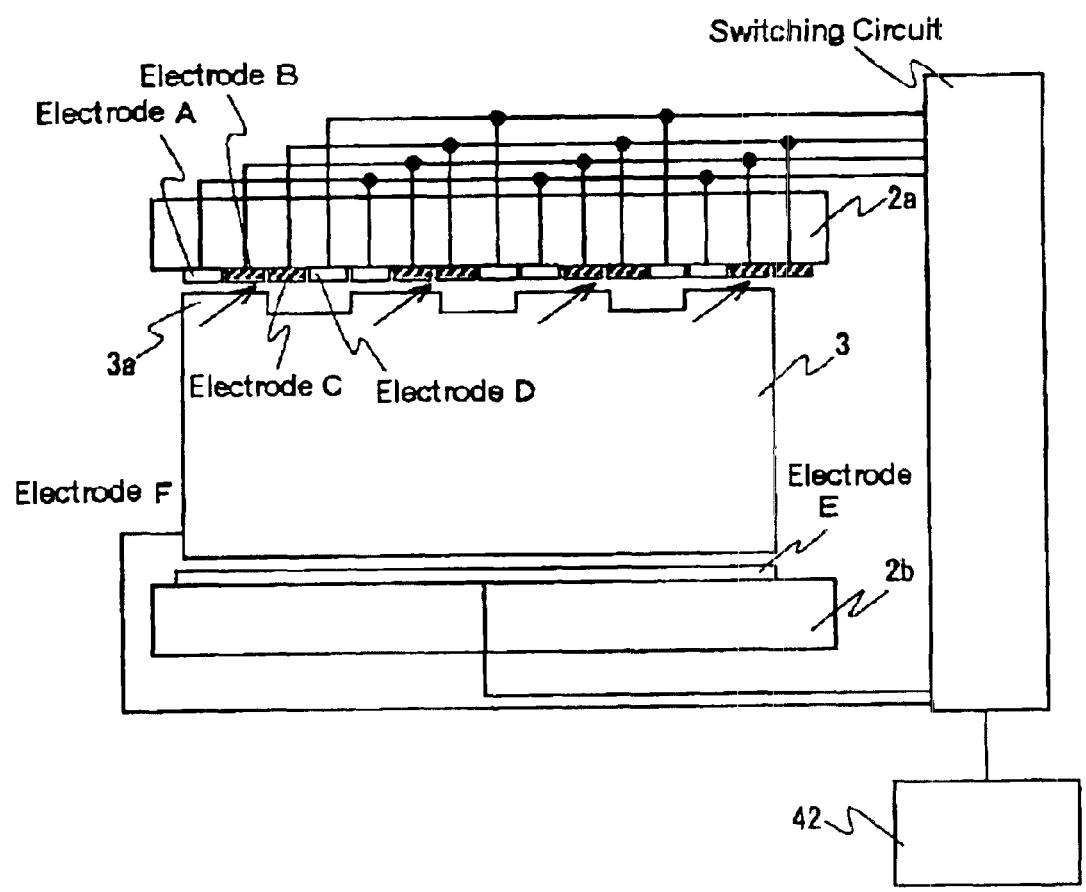
FIG. 1 is a schematic diagram showing an embodiment of an electrostatic actuator according to the present invention.

FIG. 1 is a schematic diagram showing a structure of an exemplary embodiment of an electrostatic actuator according to the present invention. Like reference numerals as used in FIGS. 24 and 25 denote corresponding components in FIG. 1.

The exemplary electrostatic actuator is comprised of first and second statical members 2a and 2b opposed to each other and a movable piece 3 positioned between them and slidable in a direction designated by an arrow 24.

The first and second statical members 2a and 2b may be plate-like in shape, or alternatively be semi-cylindrical. When the first and second statical members 2a and 2b have a plate-like shape, the movable piece 3 may accordingly be shaped like a solid or hollow block which has its opposite almost flat surfaces faced with the statical members, or when the first and second statical members 2a and 2b have a semi-cylindrical shape, the movable piece 3 may correspondingly be shaped like a solid or hollow cylinder.

Figure 2:
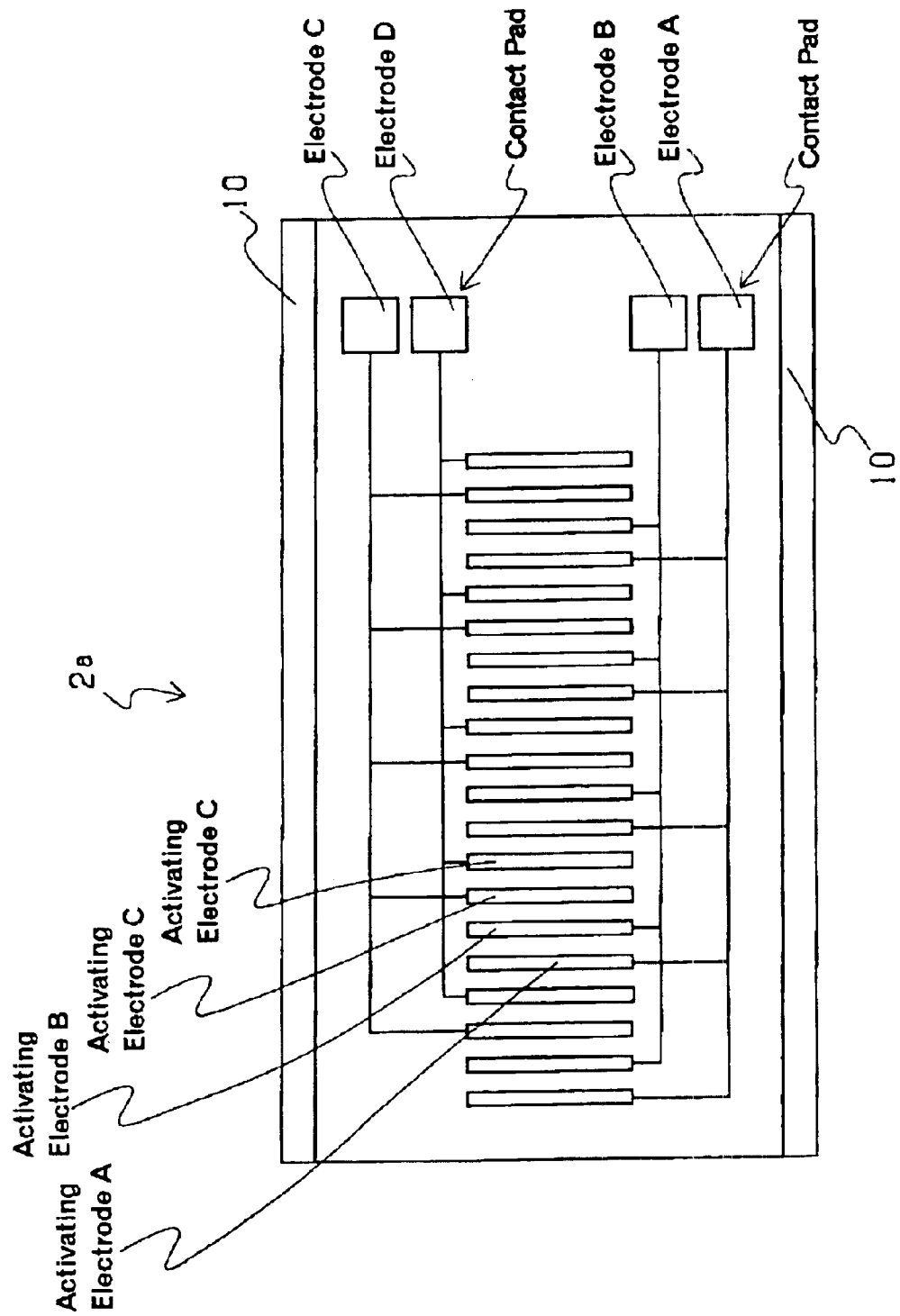

FIG. 2 is a plan view showing a deployment of groups of branch pads in the first statical member 2a respectively connected to electrodes A to D.

As can be seen in FIG. 2, the first statical member 2a has four groups of the branch pads A to D correlated to the electrodes designated by the corresponding alphabetic symbols while the second statical member 2b has a uniformly distributed electrode E over a surface. The four groups of the branch pads A to D are arranged as depicted in FIG. 2 to serve as "activating electrodes" in a stripe deployment where one branch pad from each group is succeedingly positioned one after another in the fixed order along a direction of advancement of the movable piece 3. A predetermined level of voltage is applied from a voltage supply 42 through a switching circuit 40 to all branch pads of each group simultaneously.

As shown in FIG. 2, an application of the supply voltage to the branch pads is switched from one to another in the fixed order, and since the branch pads are used to advance the movable piece in a specified direction, those branch pads A to D will be referred to as "activating electrodes" hereinafter. The uniformly distributed electrode E provided in the second statical member 2b will also be referred to as "lower electrode" hereinafter. The lower electrode may be discrete if discrete electrode elements are uniformly distributed and are of the same kind.

The reference numeral 10 in FIG. 2 denotes a stopper defining a fixed clearance between the movable piece 3 and the activating electrodes. This will be detailed later.

Figure 3:
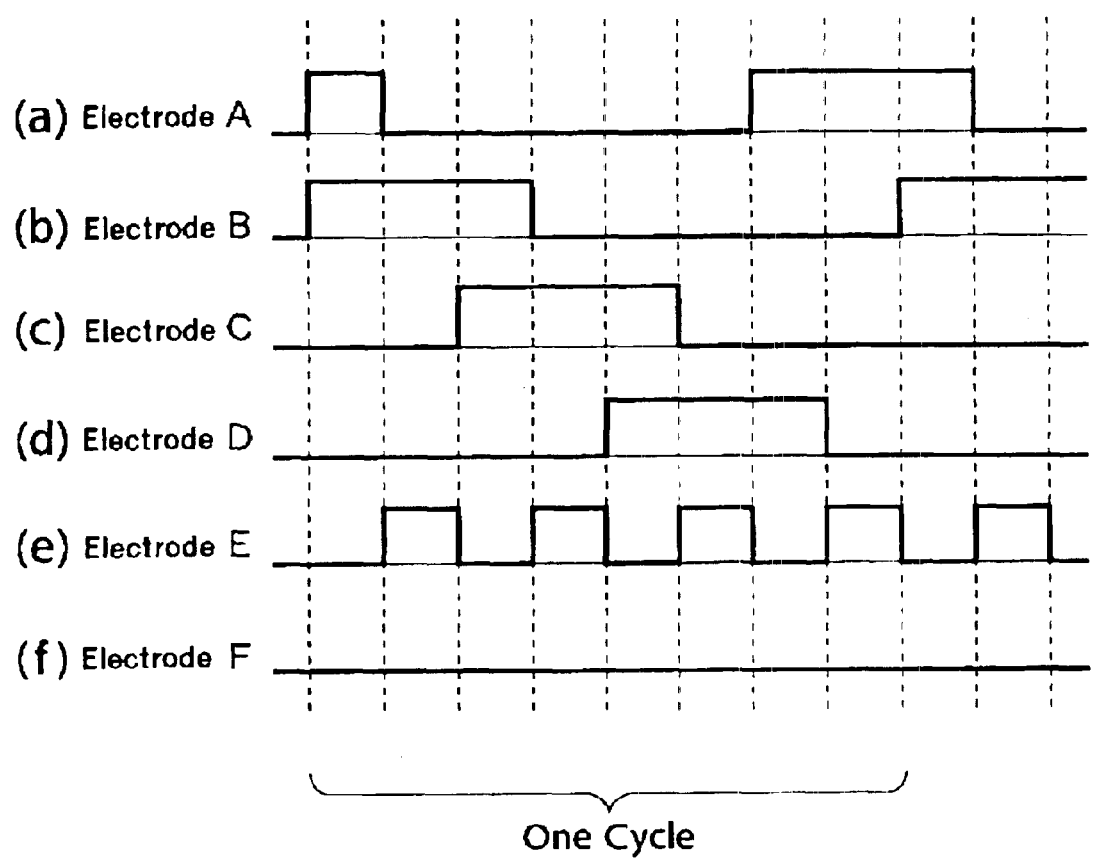
FIG. 3 is a timing chart illustrating waveforms of voltage applied to the electrodes by a switching circuit 40 in the electrostatic actuator of the embodiment of the present invention.

FIG. 3 is a timing chart illustrating waveforms of voltage applied to the electrodes through the switching circuit 40 in the electrostatic actuator according to the present invention.

The timing can be analyzed and expressed briefly as "upon an application of voltage to the lower electrode, any of the activating electrodes are simultaneously supplied with voltage". Applying voltage at the timing as depicted in the chart permits the movable piece 3 to laterally advance while being attracted and almost fitted onto the first statical member 2a.

Regarding the timing exemplified in FIG. 3, initially, an electrode F connected to the movable piece 3 keeps its potential at a low level as shown in FIG. 3(f) while the activating electrodes A and B are supplied with voltage as shown in FIGS. 3(a) and 3(b). Thus, an electrostatic force between the activating electrodes A and B and the movable piece 3 causes the movable piece 3 to be attracted by the activating electrodes A and B and almost fitted onto the first statical member 2a.

Then, simultaneous with the timing of turning the activating electrode A to the low level, the lower electrode E has its potential turned to the high level. During this stage, the voltage applied to the activating electrode B keeps at the high level. Thus, the movable piece 3, which is continuously attracted and almost fitted onto the first statical member 2a having the "activating electrode" activated, is also attracted by the lower electrode E and forced to insufficiently free from the first statical member 2a. The movable piece 3 creepingly floats laterally toward the activating electrode B. The activating electrode B in this stage serves as "assisting electrode" that disturbs the lower electrode E from capturing the movable piece 3 with its attractive force.

After that, while the activating electrode B keeps its potential at the high level, the activating electrode C is supplied with voltage to the high level, and the lower electrode E has its potential turned to the low level. Resultantly, the movable piece is attracted by the first statical member 2a while creeping laterally toward the activating electrode C.

Subsequently, while the activating electrode C keeps its potential at the high level, the activating electrode B has its potential turned to the low level, and the lower electrode E is supplied with voltage to the high level. As a result, the movable piece 3, while continually being attracted and almost fitted onto the activating electrodes, is also attracted by the lower electrode E and forced to insufficiently free from the first statical member 2a, and it creepingly floats toward the activating electrode C. Thus, the activating electrode C similarly serves as the "assisting electrode".

After the activating electrodes C, D, and A are sequentially supplied with voltage in the similar procedure, one cycle is completed. The similar cycle is repeated for the subsequent series of the activating electrodes A to D, and consequently, the movable piece 3, while continuously kept almost fitted onto the first statical member 2a by the attractive force, can move laterally.

In this way, simultaneous with the application of voltage to the lower electrode E, any of the activating electrodes A to D is supplied with voltage to serve as the "assisting electrode", and this effectively restrains the vertical vibration of the movable piece 3 and permits the movable piece almost fitted onto the activating electrode to advance smoothly.

Figure 4:
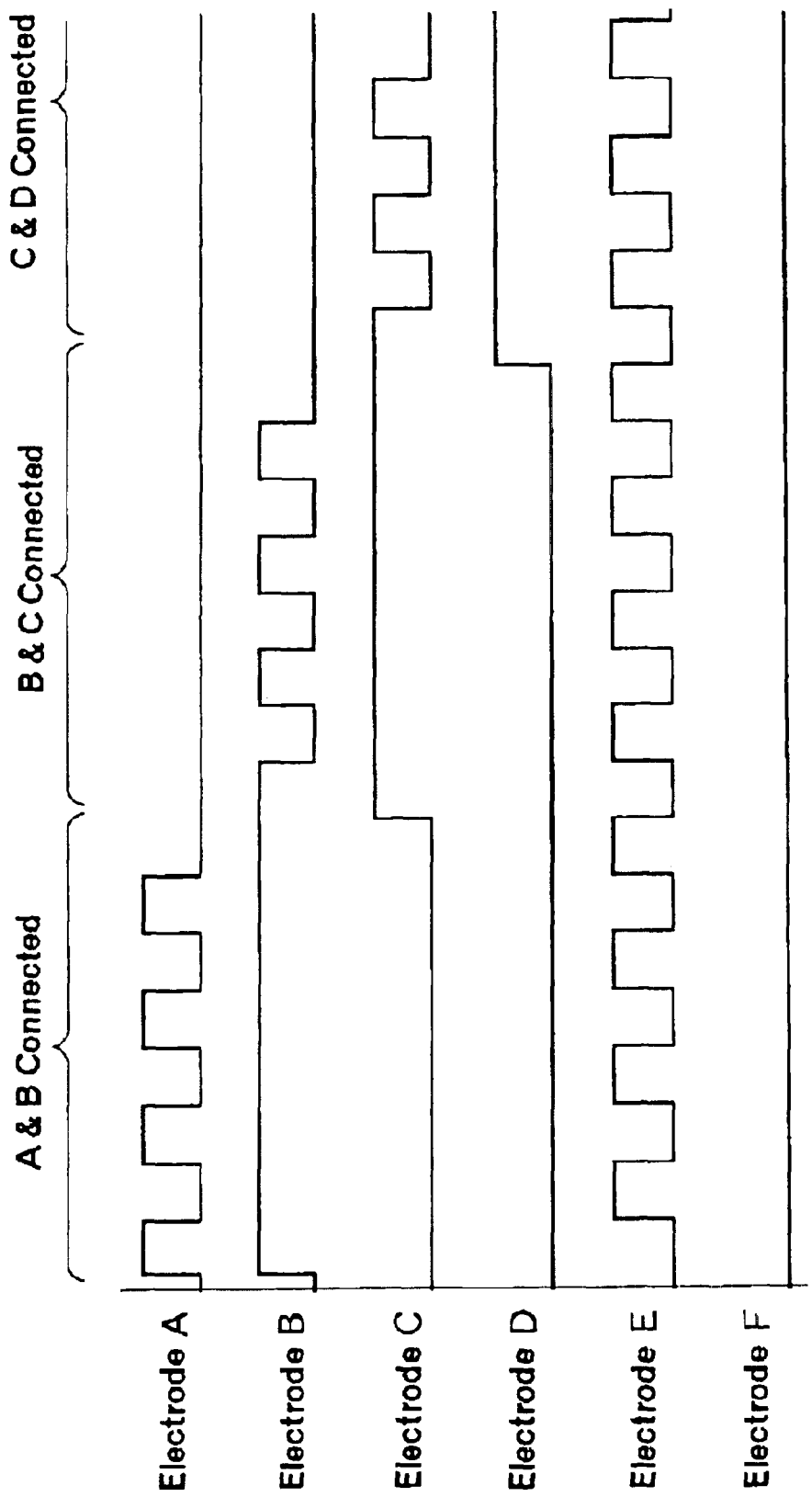
FIG. 4 depicts a varied timing chart illustrating waveforms of voltage applied to the electrodes by the switching circuit 40 in the electrostatic actuator of the embodiment of the present invention.

FIG. 4 is a timing chart of a variation of the electrostatic actuator according to the embodiment of the present invention, showing waveforms of the voltage applied to the electrodes. In this variation, the adjacent ones of the electrodes such as the electrodes A and B are supplied with voltage in a ON/OFF pattern as depicted in the initial segment of the chart where one of the electrodes is turned on and then immediately turned off, and this succeeding procedure is repeated four times. The electrode E has its voltage level switched in accord with the succeeding ON/OFF. This ON/OFF pattern is followed by the next adjacent ones of the electrodes such as the electrodes B and C, and after the succeeding procedure is repeated four times, the same ON/OFF pattern is followed by the further next adjacent ones of the electrodes such as the electrodes C and D. This is further followed by the succeeding electrode couples D and A, and so on.

Repeatedly turning on and off the adjacent ones of the electrodes in the aforementioned manner can ensure the advancement of the movable piece. In the single ON/OFF pattern, one of the electrodes is turned on and then immediately turned off four times, but the number of times of the succeeding procedure should not be limited; that is, the frequency of the turning on and off can be determined as desired in each application, and the pattern may be repeated more or less frequently than four times.

Figure 5:
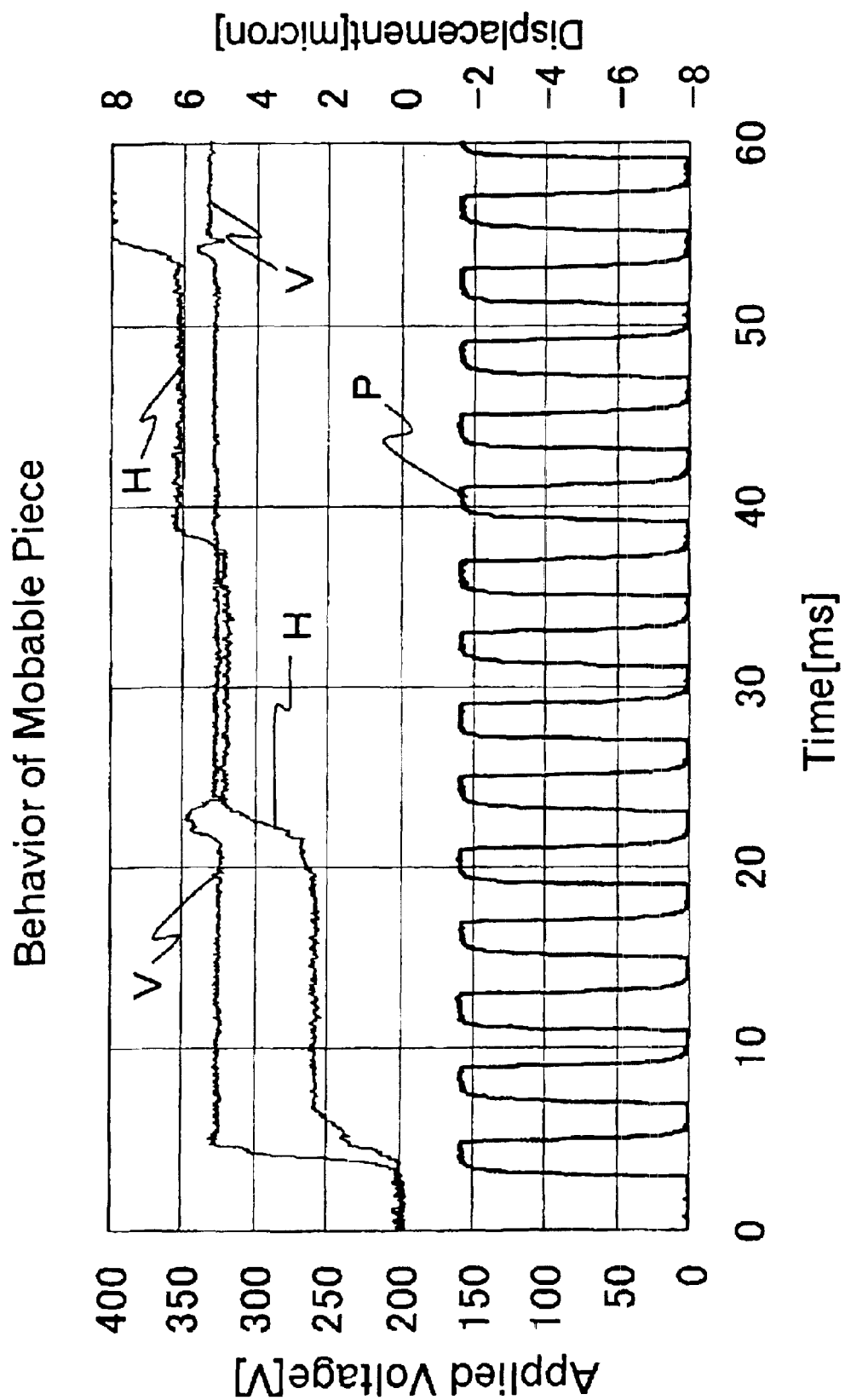
FIG. 5 is a graph showing measurements resulted from motions of the electrostatic actuator which is activated at the timing shown in FIG. 3.

FIG. 5 is a graph showing measurements resulted from monitoring the motion of the movable piece when the electrostatic actuator is activated at the timing as depicted in FIG. 4. The horizontal axis represents the time, and the vertical axis on the left shows voltage applied to the electrodes while the vertical axis on the right shows a displacement of the movable piece 3. Rectangles plotted in a lower half of the graph show a waveform P of voltage applied to the electrodes while those in an upper half of the graph show a vertical displacement V of the movable piece 3, and line extending from the lower left to the upper right in the graph also represents a lateral displacement H of the movable piece 3 in directions of its advancement.

In FIG. 5, the lateral displacement is plotted at a reduction scale of 1/10 to the vertical displacement. In other words, a lateral displacement is actually ten times as long as a vertical displacement indexed at the same graduation line along the vertical axis.

As will be recognized in FIG. 5, after attracted toward the activating electrodes at the initial timing, the movable piece 3 moves laterally while continuously keeping almost fitted onto the activating electrodes. Applying voltage alternately to the activating electrodes and the lower electrode, the movable piece 3 moves laterally while vertically vibrating.

In contrast, in the embodiment of the present invention, voltage is simultaneously applied to the lower electrode and the activating electrodes. In this manner, as depicted in FIG. 5, the movable piece 3 is permitted to move smoothly in lateral directions while continuously attracted and almost fitted onto the activating electrodes. As a consequence, undesired vertical vibration can be restrained, and an additional effect similar to that which is attained in the condition of reduced clearances between the movable piece 3 and the statical member 2a can be obtained; that is, the motive force for the attraction and displacement of the movable piece is advantageously enhanced. Thus, since the clearances between the activating electrodes A to D and the movable piece 3 can keep minimized, the sufficient and stable attracting force or Coulomb force effects upon the movable piece 3.

In the embodiment shown in FIG. 5, one of the adjacent electrodes succeedingly and repeatedly turns on and then off four times. It should be noted that the first turning on and off causes the movable piece 3 to laterally move, and the remaining ON/OFF actions repeated three times cause almost no lateral displacement of the movable piece 3. This is because the initial turning on and off on the adjacent electrodes (e.g., the electrodes A and B) forces the movable piece to fall in a standoff zone of the activated electrodes. On the contrary, when some disturbance such as frictional force on the movable piece 3 acts to keep the movable piece 3 off the standoff zone even after the initial turning on and off, it is likely for the second or even succeeding turning on and off can cause the movable piece to reach the standoff zone.

(Second Embodiment)

A second embodiment of the electrostatic actuator will now be described in the context of an improved feature of adjusting a balance of voltage applied to the activating electrodes and the lower electrode.

The inventors reviewed the first embodiment of the electrostatic actuator and obtained some quantitative observations on the clearances between the statical member 2a and the movable piece 3 and the voltage applied to the electrodes.

A mechanical structure will be outlined for comprehensive recognitions of this embodiment.

Figure 6:
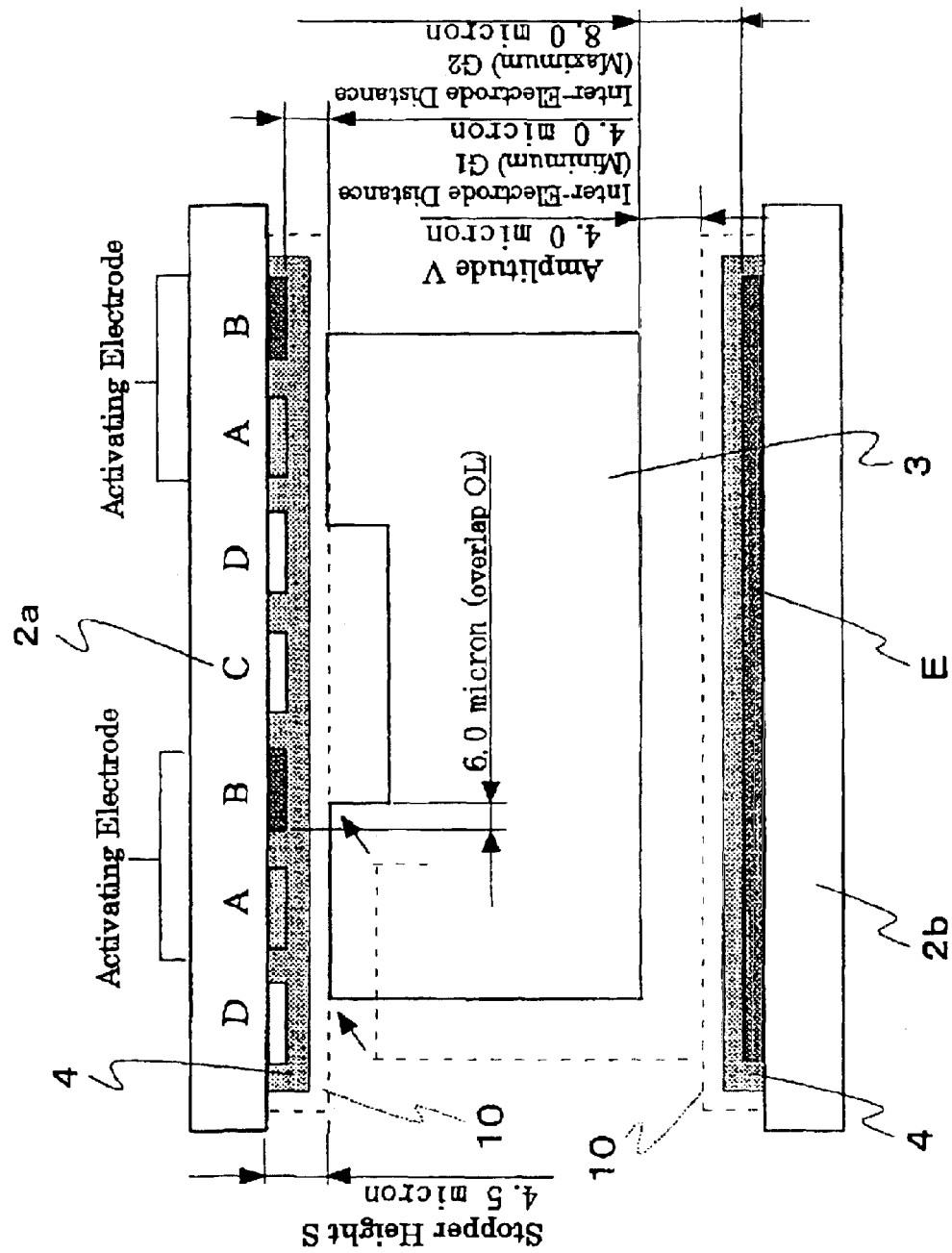
FIG. 6 is a sectional view showing a mechanical structure of the electrostatic actuator of the embodiment of the present invention.

FIG. 6 is a sectional view showing the mechanical structure of the electrostatic actuator of the embodiment of the present invention. The activating electrodes A to D and the lower electrode E have their respective operation surfaces covered with protective film 4, respectively. The protective film 4 is of insulating material such as inorganic composites including silicon oxide and silicon nitride, and organic composites including polyimide.

Figure 7A:
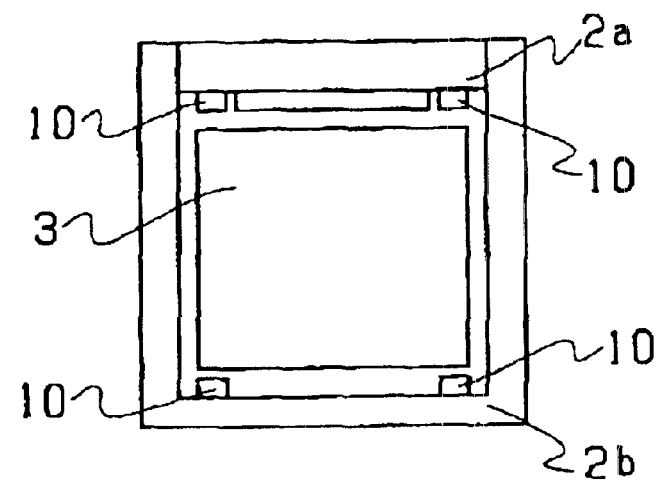
FIGS. 7A and 7B are diagrams showing an exemplary electrostatic actuator where vertically juxtaposed statical members 2a and 2b has a stopper 10 and a movable piece 3 makes a frictional movement relative to the stopper 10.
Figure 7B:
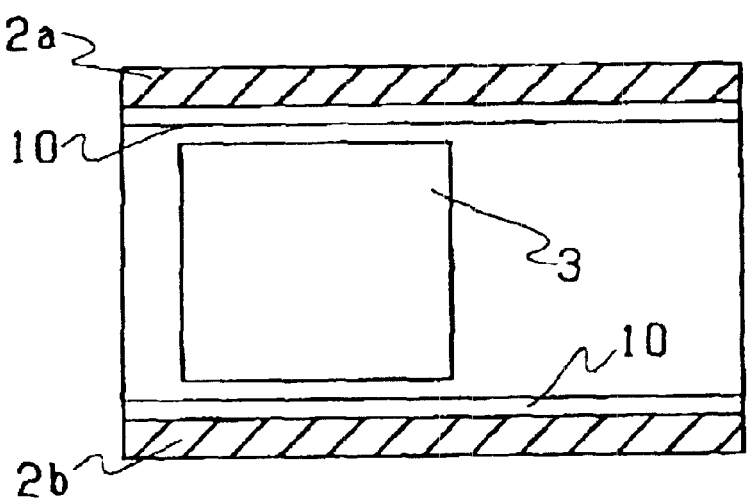
Figure 8A:
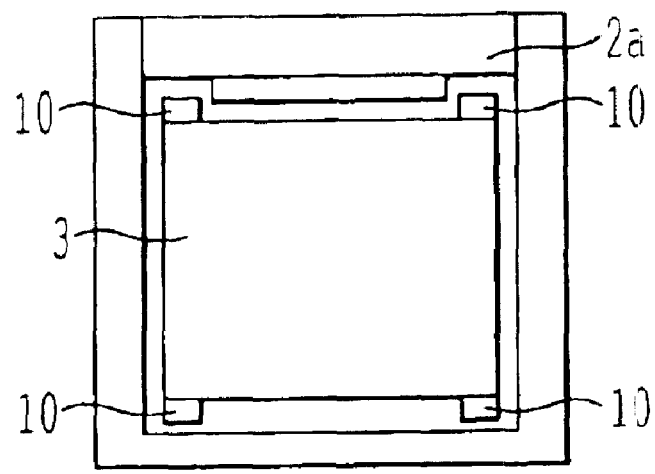
FIGS. 8A and 8B are diagrams showing an exemplary electrostatic actuator where the stopper 10 is placed in the movable pieces 3, respectively, to block contact.
Figure 8B:
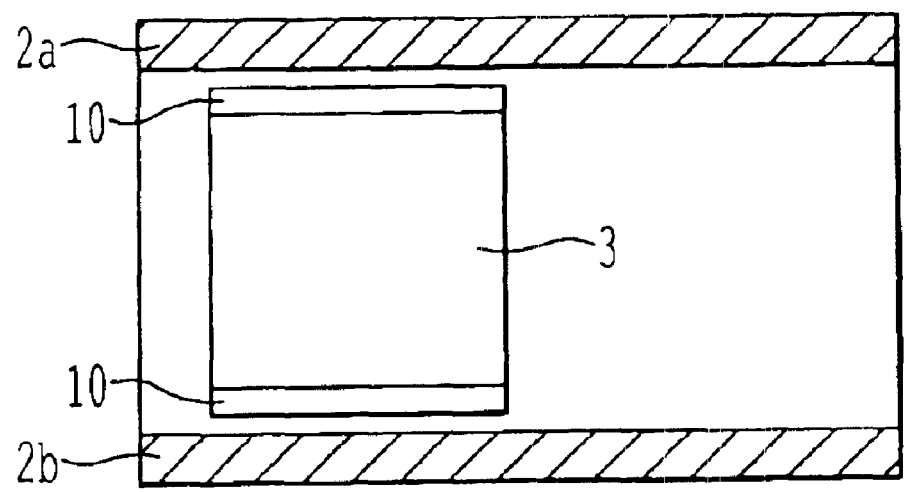

A stopper 10 is provided to avoid direct contact of the protective film 4 with the movable piece 3. For instance, as shown in FIGS. 7A and 7B, the upper and lower pieces 2a and 2b respectively have the stopper 10 in their surface to permit the movable piece 3 to acts frictionally on the stopper 3, and thus, the movable piece 3 can keep off the protective film 4. Alternatively, as illustrated in FIGS. 8A and 8B, a contact breaking element such as the stopper 10 may be placed on the movable piece 3.

Turning to FIG. 6, again, to proceed with the discussion, there are given sample values of a height of the stopper and a width of the clearance. A height S of the stopper may be approximately 4.5 microns. An amplitude value V in which the movable piece 3 can traverse may be 4.0 microns.

Also, FIG. 6 depicts the movable piece 3 attracted and almost fitted on the activating electrodes A to D, and this posture minimizes an inter-electrode distance, namely, a distance between the movable piece 3 and the activating electrodes A to D. The inter-electrode distance (minimum) G1 may be approximately 4.0 microns. A height of the activating electrodes A to D may be approximately 0.5 microns. Under such circumstances, another inter-electrode distance, namely, a distance between the movable piece 3 and the lower electrode E is maximized. This inter-electrode distance (maximum) G2 may be 8.0 microns.

Taking a longitudinal dimension in consideration, when, for one reference, projections 3a of the movable piece 3 are stationed having their respective center positioned in the activating electrode A, a length of the projections 3a and pitches of the sequence of the activating electrodes A to D can be determined by fixing an amount of overlap between each projection 3a and the activating electrode B to approximately 6.0 microns.

Figure 9:
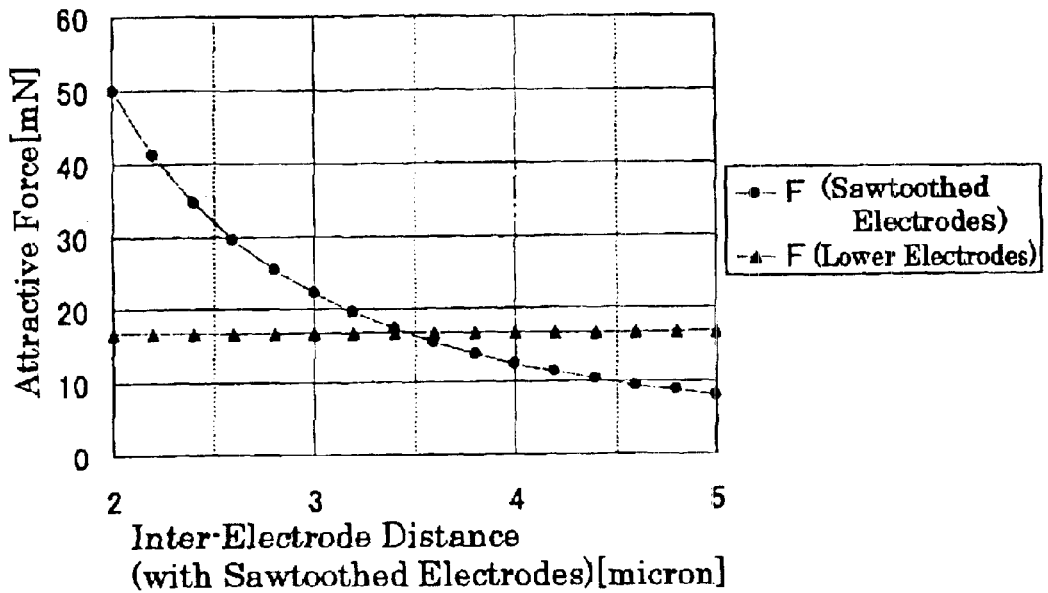
FIG. 9 is a graph showing a relation between the attracting force effected upon the movable piece 3 and a distance of the electrodes with applied voltage of 150 V.

FIG. 9 is a graph showing a relation between an attractive force on the movable piece 3 and the inter-electrode distances. In this graph, the horizontal axis represents the inter-electrode distance between the movable piece 3 and the activating electrodes A to D while the vertical axis represents the attractive force on the movable piece 3. Also, in FIG. 9, the inter-electrode distance (maximum) G2 is fixed at 8 microns while the height S of the stopper is varied, and the attractive force is monitored in relation with the varied distance between the movable piece 3 and the activating electrodes A to D.

In this case, it is assumed that the movable piece 3 keeps attracted and almost fitted onto the activating electrodes A to D, as depicted in FIG. 6. Thus, the distance between the movable piece 3 and the activating electrodes A to D represented on the horizontal axis is identified with the inter-electrode distance (minimum) G1. The value is equal to an amount of the height S of the stopper minus the thickness of each of the electrodes A to D.

The force developed between the movable piece 3 and the activating electrodes A to D, and between the movable piece 3 and the lower electrode E can be expressed by the following formula:

$$F = \varepsilon \frac{SV^2}{2d^2}$$

where $\varepsilon$ is a dielectric constant ($8.85 \times 10^{-12}$ F/m in vacuum condition), S is an area of each activating electrode, V is an applied voltage, and d is an inter-electrode distance (clearance), respectively.

When a distance between the movable piece 3 and the electrodes A to E is varied in the course of the operation, there arises ripple in output across the electrodes. A value of the inter-electrode distance (maximum) G2 affects a minimum value of the output ripple, and if the G2 is raised, the output ripple (minimum) is decreased. Thus, FIG. 9 depicts the relation of the movable piece 3 with the attractive force under the assumption that the inter-electrode distance (maximum) G2 is fixed while the height S of the stopper is varied.

In FIG. 9, when the inter-electrode distance (minimum) G1 is smaller than 3.5 microns, the attractive force from the activating electrodes A to D upon the movable piece 3 is higher than that from the lower electrode E upon the same, and if the inter-electrode distance G1 rises beyond 3.5 microns, the former relation is reversed, and the attractive force from the lower electrode E is greater.

When the movable piece 3 is activated while continually kept attracted by the activating electrodes A to D, the inter-electrode distance (minimum) G1 must be lower than 3.4 microns. This means that the upper limit of the height S of the stopper is approximately 4.0 micron.

Allowing for the attractive force upon the movable piece 3, it is desirable the height S of the stopper is reduced. Actually, when the height S of the stopper is reduced, however, it should possibly occur that a contact of the movable piece 3 with the protective film 4 causes deterioration and failure. A reduction of the inter-electrode distance (minimum) G1 causes an increase in an intensity of the electric field, and hence, discharge breakdown of the protective film is more likely to cause deterioration and failure. When the protective film 4 is damaged, it is more likely to undergo discharge breakdown, and hence, the damage and the discharge breakdown, when they are the cause of each other, heightens a potential risk of deterioration and failure. In view of reliability of any practical use in various applications, this is a matter of importance.

Thus, it is critical that structure parameters and activation conditions are appropriately determined as required in specifications for any use and application of the electrostatic actuator so that the electrostatic actuator can attain the maximum attractive force as possible while ensuring its operation reliability.

Figure 10:
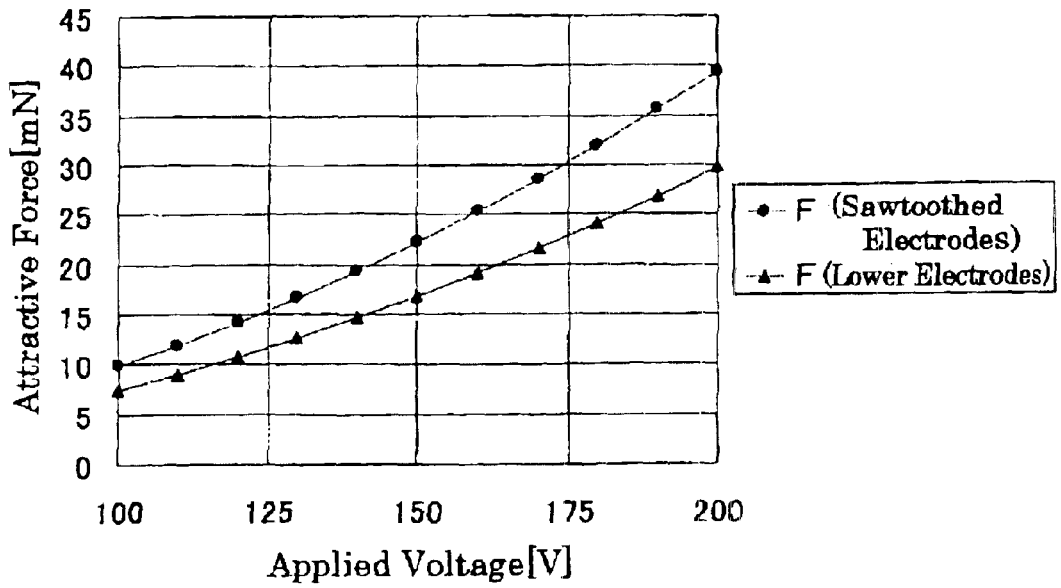
FIG. 10 is a graph showing a relation of the applied voltage with the attracting force developed between the branch pads and the movable piece, and between the lower electrode and the movable piece with a stopper height S of 3.5 microns.
Figure 11:
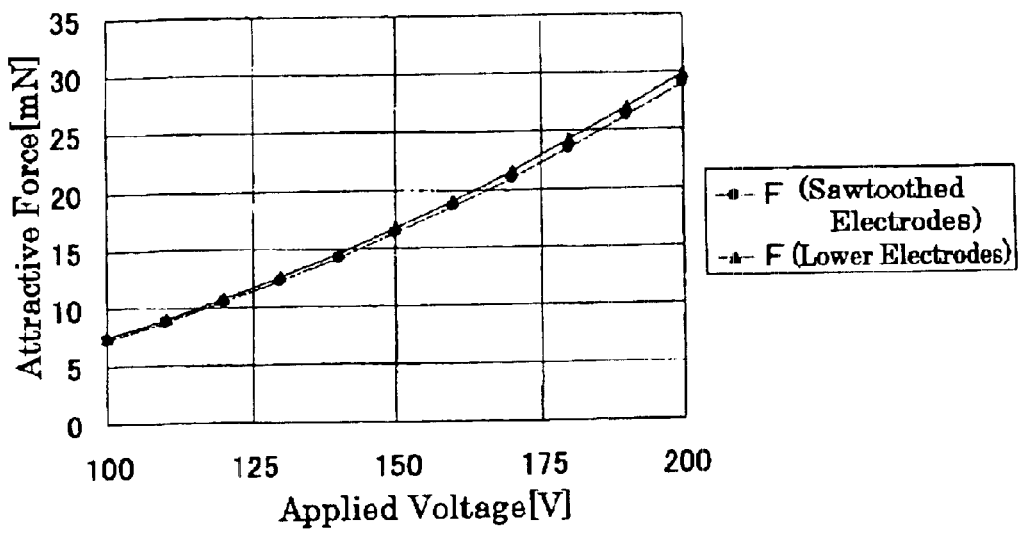
FIG. 11 is a graph showing a relation of the applied voltage with the attracting force developed between the branch pads electrode and the movable piece, and between the lower electrode and the movable piece with the stopper height S of 4.0 microns.
Figure 12:
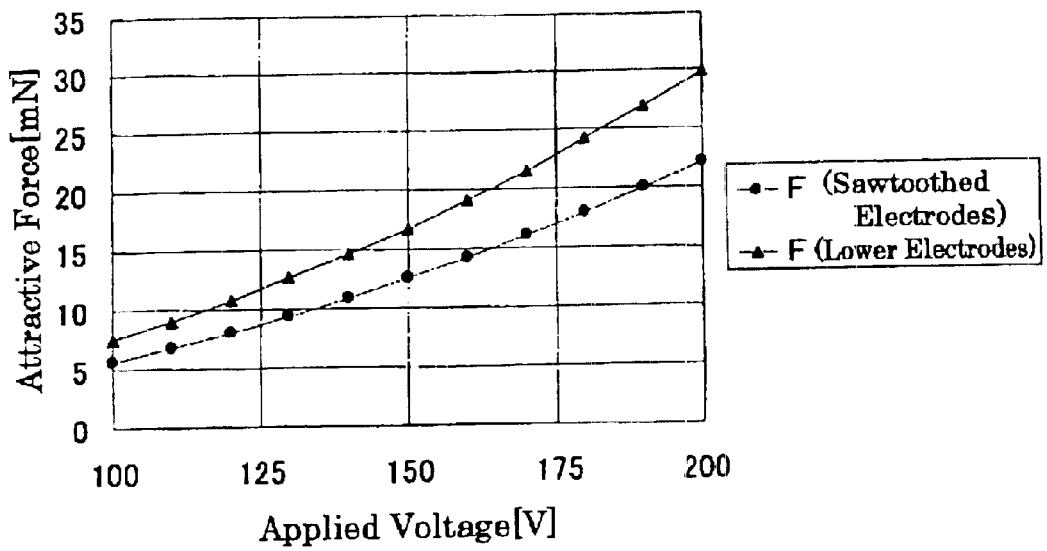
FIG. 12 is a graph showing a relation of the applied voltage with the attracting force developed between the branch pads and the movable piece, and between the lower electrode and the movable piece.

Referring to FIGS. 10 to 12, an example of the procedure will be explained.

FIG. 10 is a graph showing relations of the applied voltage to the attractive force acting between the activating electrode and the movable piece, and between the lower electrode and the movable piece, under the condition of the height S of the stopper of 3.5 microns. In FIG. 10, the dimensional parameters as exemplified in FIG. 6 are used, and the height S of the stopper is 3.5 microns. Thus, the inter-electrode distance (minimum) G1 is 3.0 microns.

With this height of the stopper and with voltage applied in a rage from 100 V to 200 V, the attractive force from the activating electrodes A to D upon the movable piece 3 is always higher than that from the lower electrode E upon the movable piece 3. Naturally, the movable piece 3 is activated while continuously attracted toward the activating electrodes A to D. When the reliability of the actuator and the precision of machining components tolerate this height S of the stopper, there arises no problem due to the height. For example, once determined that the movable piece would not come in contact with the protection film 4 in a range of the varied height that is presumed based upon the precision of machining the stopper 10, it is possible to use the height in the range.

FIG. 11 is a graph illustrating relations of the applied voltage to the attractive force acting between the activating voltage and the movable piece, and between the lower electrode and the movable piece. In a case of the figure, with the height S of the stopper of 4.0 microns, the attractive forces match between the activating electrode and the movable piece, and the lower electrode and the movable piece, and this leaves the movable piece unstable.

Specifically, under the conditions, the movable piece 3 is not always attracted toward the activating electrodes A to D, and sometimes it may be attracted and almost fitted onto the lower electrode E to exhibit vertical vibration.

FIG. 12 is a graph showing the relations of the applied voltage to the attractive force between the activating electrodes and the movable piece, and between the lower electrode and the movable piece under the condition of the height S of the stopper of 4.5 microns. In the graph, it is apparent that with the height S of the stopper of 4.5 microns, the relations between the activating electrodes and the movable piece and between the lower electrode and the movable piece are switched and reversal.

It seems that if operating waveform with timing assist is given, the movable piece 3 vertically vibrates in accordance with given timing that depends upon an instructed voltage level. This would never promise an enhancement of stable and sufficient actuating performance.

On the other hand, in view of the precision of component machining and the device reliability, sometimes it is desired that the height S of the stopper is predetermined higher than usual as in FIGS. 11 and 12. Accordingly, in the embodiment of the present invention, voltage applied to the lower electrode E is regulated to have a stable operation.

This manner of stabilization will be discussed below with reference to FIG. 12.

It is now assumed that the voltage applied to the activating electrodes A to D is determined in advance to be 150 V. Under the condition, the lower electrode E may be adjusted to keep the attractive force from the lower electrode E smaller than that from the activating electrodes A to D.

Specifically, what to do fist is to get a value of the attractive force between the activating electrodes and the movable piece when 150 V is applied. It is approximately 12.5 mN in FIG. 12. Then, a voltage level at the lower electrode required for developing the same level of force as the attractive force must be known. In FIG. 12, it is recognized as being approximately 130 V. If the known voltage or voltage smaller is applied to the lower electrode E, the attractive force from the activating electrodes A to D is always higher, and the movable piece 3 can be activated while continually keeping attracted and almost fitted onto the activating electrodes A to D.

In this embodiment, regulating the relation between the applied voltage to the activating electrodes A to D and that to the lower electrode E to keep the desired state where the attractive force from the activating electrode is always higher, so that the stable attractive force acts upon the movable piece without vertical vibration of the same.

(Third Embodiment)

A third embodiment of the present invention will be described, which is an electrostatic actuator having a well-balanced electrode area of the activating electrodes relative to the lower electrode.

In this embodiment, instead of adjusting voltage applied to each of the electrodes as described regarding the second embodiment, areas of the upper and lower electrodes are regulated relative to each other to keep the well-balanced state of the attractive force between those electrodes.

For example, the activating electrodes A to D are deployed in repeated stripes as shown in FIG. 2, and voltage is applied to a specific group(s) of the electrodes. In response to this, the lower electrode E develops attractive force.

As to the operation sequence illustrated in FIG. 3, only one group of the same branch electrodes A, B, C or D are supplied with voltage simultaneous with an application of voltage to the lower electrode E. Thus, a face-to-face area of all the activating electrodes in the same group to the movable piece 3 should be adjusted to have a desired valance with the face-to-face area of the lower electrode E to the movable piece 3.

In an alternative simplified manner, the face-to-face area of the activating electrodes of the same group to the movable piece 3 may be larger than the face-to-face area of the lower electrode E to the movable piece 3. A rate of one of the face-to-face area to the other may be determined as required, depending upon the applied voltage and the height S of the stopper.

The point is that the movable piece 3 should be activated while keeping continuously attracted and almost fitted onto the activating electrodes A to D.

Figure 13:
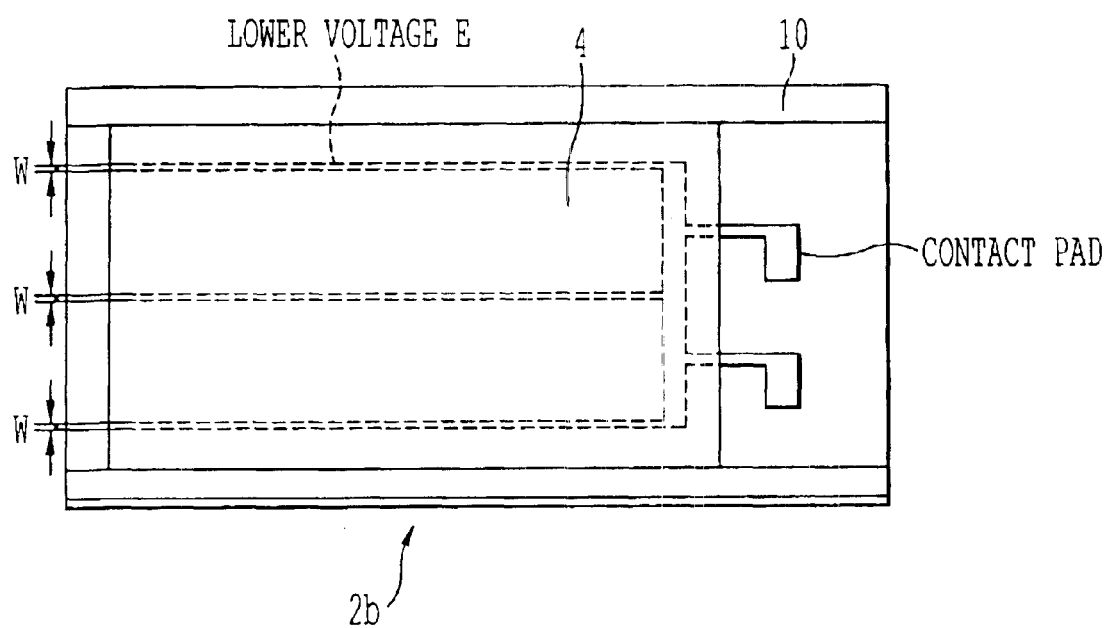
FIG. 13 is a diagram showing a planar pattern of the lower electrode E.

FIG. 13 is a schematic diagram illustrating a plane pattern of the lower electrode E. The lower electrode E is shaped in three parallel stripes, respectively extending in an advancement direction of the movable piece 3. A width W of each strip is varied to adjust the total area of the lower electrode E.

Thus, besides the parameters such as the height S of the stopper and the voltage applied to the electrodes A to E, the stripe width W of the lower electrode E should be varied so that the activating electrodes always exert greater attractive force. Consequently, the stable attractive force acts upon the movable pieces 3 to move it without vertical vibration.

(Fourth Embodiment)

Now, a fourth embodiment will be described, which is an electrostatic actuator capable of somewhat preventing an adverse effect by dielectric polarization of the protection film 4.

Figure 14A:
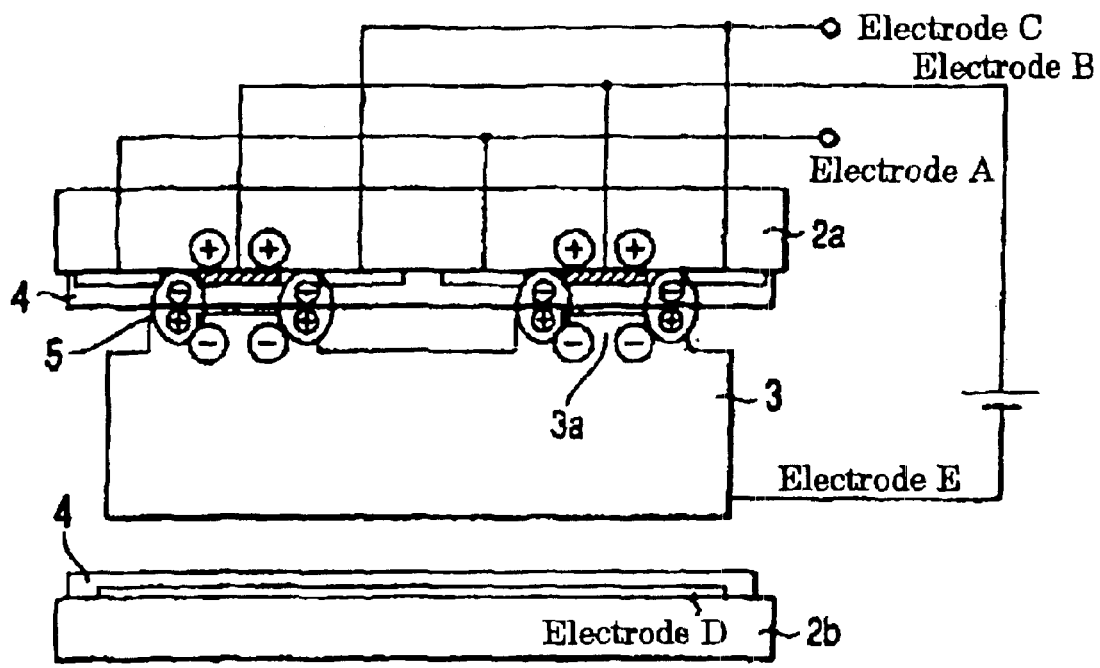
FIGS. 14A and 14B are diagrams showing a concept of an operation of a fourth exemplary electrostatic actuator of the embodiment of the present invention.
Figure 14B:
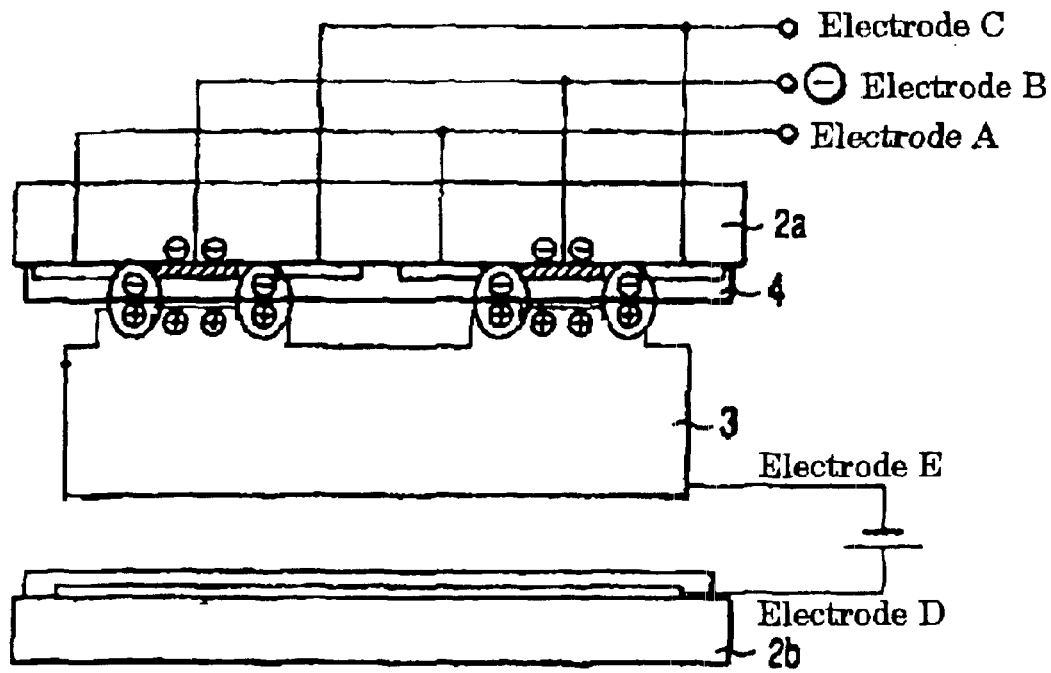

FIGS. 14A and 14B illustrate a concept of the operation of the exemplary electrostatic actuator according to the embodiment of the present invention.

Figure 15:
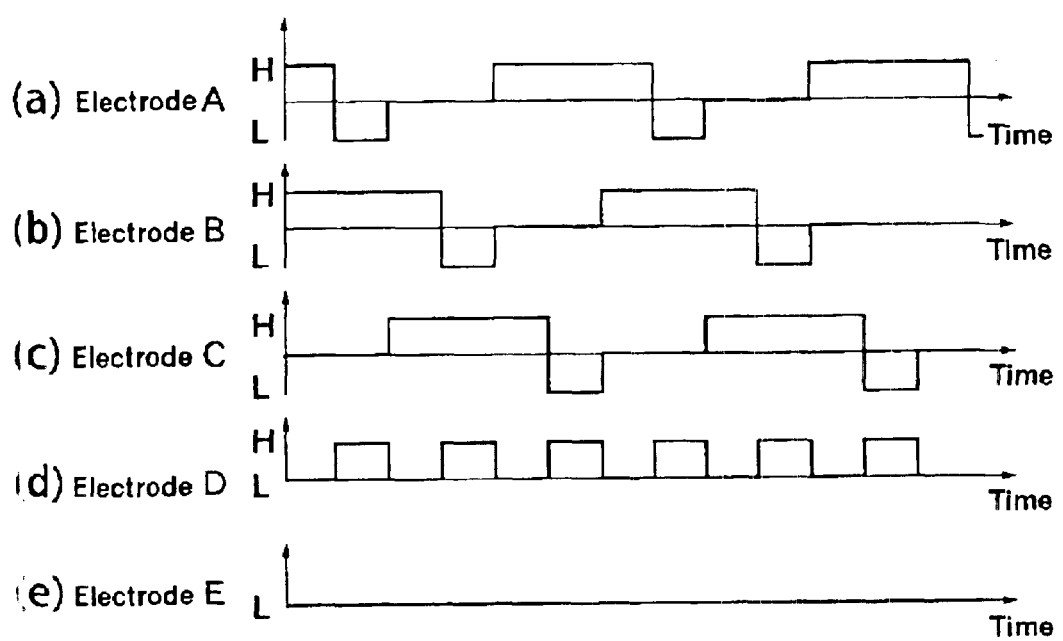
FIG. 15 is a timing chart illustrating voltage signals activating the actuator.

FIG. 15 is a timing chart of a voltage signal used to activate the actuator.

As can be seen in FIGS. 14A and 14B, there are three groups of the activating electrodes A to C, and the lower electrode D is positioned opposite to them. The number of the groups of the activating electrodes, however, is not limited to three, but there may be four groups of them, or rather there may be five or more of them.

In this embodiment, for example, applying voltage of reversed polarity to the activating electrodes A to C restrains an influence of the dielectric polarization in the protective film 4.

In the timing charts of FIG. 15, FIGS. 15(a), 15(b), and 15(c) represent voltage signals applied to the branched electrodes A, B, and C, respectively. FIG. 15(d) represents a voltage signal applied to the electrode D connected to the statical member while FIG. 15(e) shows a varied level of voltage applied to the electrode E connected to the movable piece.

Voltage applied to the electrode E in FIG. 15(e) is at ground potential. Voltage applied to the electrode D in FIG. 15(d) is switching between high H and low L, and the latter is at ground potential. Voltage signals applied to the electrodes A, B and C in FIGS. 15(a), 15(b) and 15(c) are also switching between high H and low L where the former is at a positive potential while the latter is at a negative potential, and their average level is at ground potential.

Thus, the movable piece 3 is attracted to the electrodes A, B, and C at high when the signals applied to them are turned to high H, and the movable piece 3 is repelled from the electrodes when the signals applied to them are turned to low L. The electrodes A, B and C at the potential of the intermediate level do not affect the movable piece 3.

As shown in FIG. 14A, for instance, when positive level voltage is applied to the electrode B, electrostatic force (Coulomb force) affects the movable piece 3, and it is attracted toward the statical member 2a. For convenience of explanation, FIGS. 14A and 14B depicts voltage being applied to only the group of the electrodes B, but as shown in the timing charts in FIG. 15, voltage may be applied to the remaining electrode A or C simultaneously.

When positive level voltage is applied to the electrode B as depicted in FIG. 14A, the protective film 4 at the surface of the activating electrode B cause dielectric polarization 5, and macroscopically, the electrode B behaves to the movable piece 3 as if it were at positive potential at its surface.

The dielectric polarization 5 in the protective film 4 sometimes resides even after the application of positive voltage to the electrode B is interrupted. This causes the movable piece 3 to stay continuously attracted close to the electrode B. Because of this, at the succeeding timing, the movable piece 3 may sometimes lose propelling force that urges it smoothly move to the adjacent electrode C.

This is resulted from an electrical deflection caused by the dielectric polarization in the protective film 4. Although the dielectric polarization 5 diminishes the residual potential, Coulomb force between electrodes is inversely proportional to a distance raised to the second power, and therefore, in a situation where once the movable piece 3 is attracted toward the electrode B, and the inter-electrode distance comes close to its minimum, the residual potential in the protective film 4, even if it is very low, gives considerable influence upon the movable piece 3. Since such an adverse effect is reduced in this variation of the embodiment, the operation sequence allows for the desired motion of the movable piece 3.

In this embodiment, during a transition of the operation sequence from a state where the movable piece 3 is attracted by the electrode B to a state where the movable piece is to move toward the electrode C, a potential difference is provided between the electrodes B and E so that the electrode B has a lower potential than the electrode E connected the movable piece 3 (when the movable piece 3 is at zero level of potential, the electrode B exhibits a negative potential). This results in the movable piece 3 easily leaving the protective film 4, and a smooth operation of the actuator can be attained.

Macroscopically, this can be understood well in the context of a situation of the electrode B connected to the statical member 2a and the electrode E connected to the movable piece 3 by the explanation as follows: An electric field caused by the deflection of electric charge residing in the protective film 4 due to the dielectric polarization 5 and an electric field caused due to the potential difference between the electrodes B and E (potential of B is lower than that of E) are reversed in direction to each other and cancel each other. Microscopically, this may also be taken as a phenomenon that the deflection of electric charge residing in the protective film 4 due o the dielectric polarization 5 is faded to naught by the electric field caused by the potential added to the electrode B (lower than the potential of the electrode E).

In the aforementioned embodiment, the potential at the movable piece 3 may be electrically floated without being grounded. Alternatively, a dummy electrode may be positioned proximal to the movable piece 3 and grounded so that the electrostatic force effects well upon the movable piece 3. In the embodiments shown in FIGS. 4(a) and 4(b), the protective film 4 is placed on the statical member 2a, and alternatively, it may be provided in the movable piece 3, or rather, the protective film 4 may be provided in both the statical member 2a and the movable piece 3, respectively.

Reversing a polarity of the voltage applied to the activating electrodes is not the only manner of erasing the residual polarization in the protective film 4. The similar result of reversing a polarity of the electric field applied to the protective film 4 can be obtained by switching the voltage related status between the activating electrodes and the movable piece 3 to dissipate the residual polarization.

Figure 16:
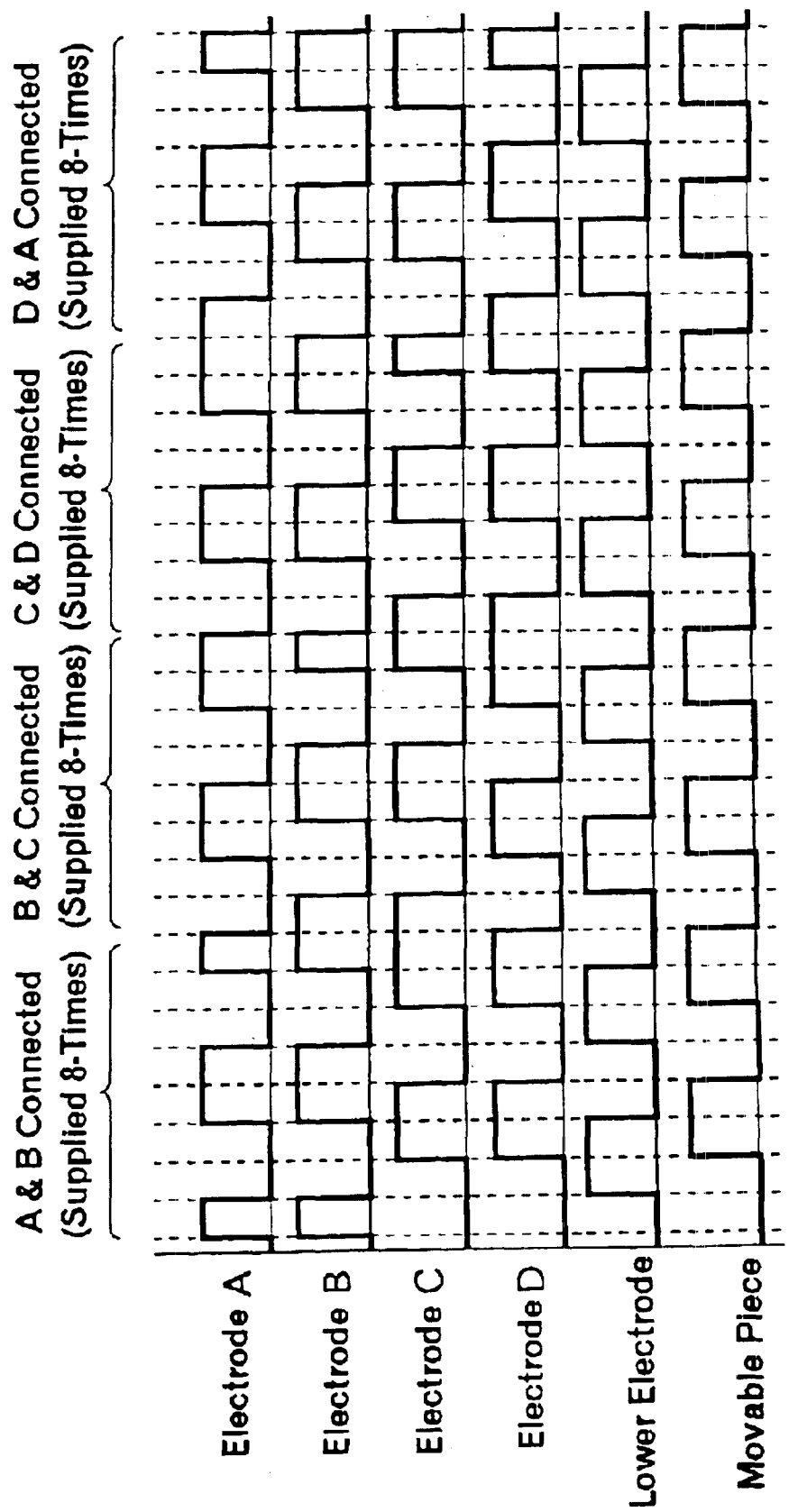
FIG. 16 is a timing chart illustrating a pattern of voltage application where the voltage between the branch pads and the movable piece is inverted to dissipate residual polarization from protective film 4.
Figure 17:
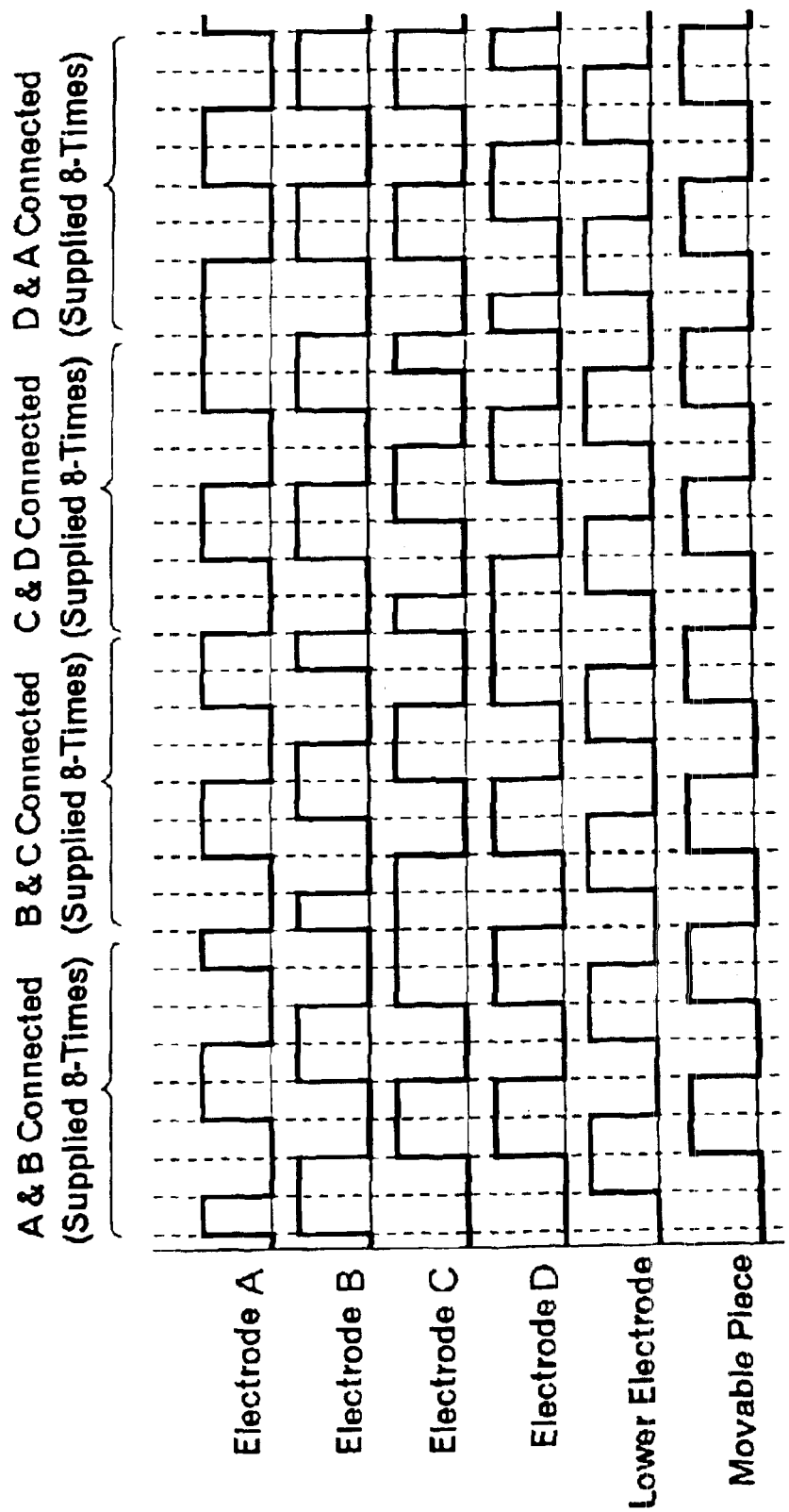
FIG. 17 is a timing chart illustrating a pattern of voltage application where the voltage between the branch pads and the movable piece is inverted in a manner according to embodiment of the present invention to dissipate the residual polarization from the protective film 4.

FIGS. 16 and 17 are timing charts illustrating a pattern of applied voltage that effective to dissipate the residual polarization in the film 4 by switching the voltage related status between the activating electrodes and the movable piece. FIG. 16 represents a timing in a sample embodiment while FIG. 17 represent a timing according to the embodiment of the present invention.

Referring to FIG. 16, at the initial time t1, voltage is first applied to the electrodes A and B without application of voltage to the movable piece 3. Then, at time t2, the electrodes A and B are turned off while instead, voltage is applied to the lower electrode. After that, at time t3, simultaneous with an application of voltage to the electrodes C and D, voltage is also applied to the movable piece 3. Since there is no voltage application to the electrodes A and B at time t3, electric field applied to the protective film 4 on the electrodes A and B is reversed in contrast to the time t1 when voltage is applied to the electrodes A and B.

The voltage relation between the electrodes A and B is switched to the reverse state from the timing t1 to the timing t3, and the electric field applied to the protective film 4 is accordingly reversed. In this way, the reversal of the electric filed enables the protective film 4 to dissipate the residual polarization therein.

A timing pattern used to dissipate the residual polarity according to embodiment of the present invention is shown in a timing chart in FIG. 17. In FIG. 17, at any time when the lower electrode is supplied with voltage, voltage is applied to specific ones of the activating electrodes A to D to avoid vertical vibration of the movable piece 3. Appropriately applying voltage to the movable piece 3 also switches the voltage relation between the activating electrodes A to D and the movable piece 3, and additionally, appropriately reversing the electric field applied to the protective film 4 enables it to dissipate the residual polarization therein.

In the aforementioned embodiments in FIGS. 14A through 15, although three levels of voltage or positive, negative and ground levels are required, the embodiments shown in FIGS. 16 and 17 advantageously provides a manner of dissipating the residual polarity in the protective film 4 simply by two levels of voltage, or positive (or negative) and ground levels.

(Fifth Embodiment)

A fifth embodiment of the electrostatic actuator having a plurality of movable pieces will now be described.

Figure 18:
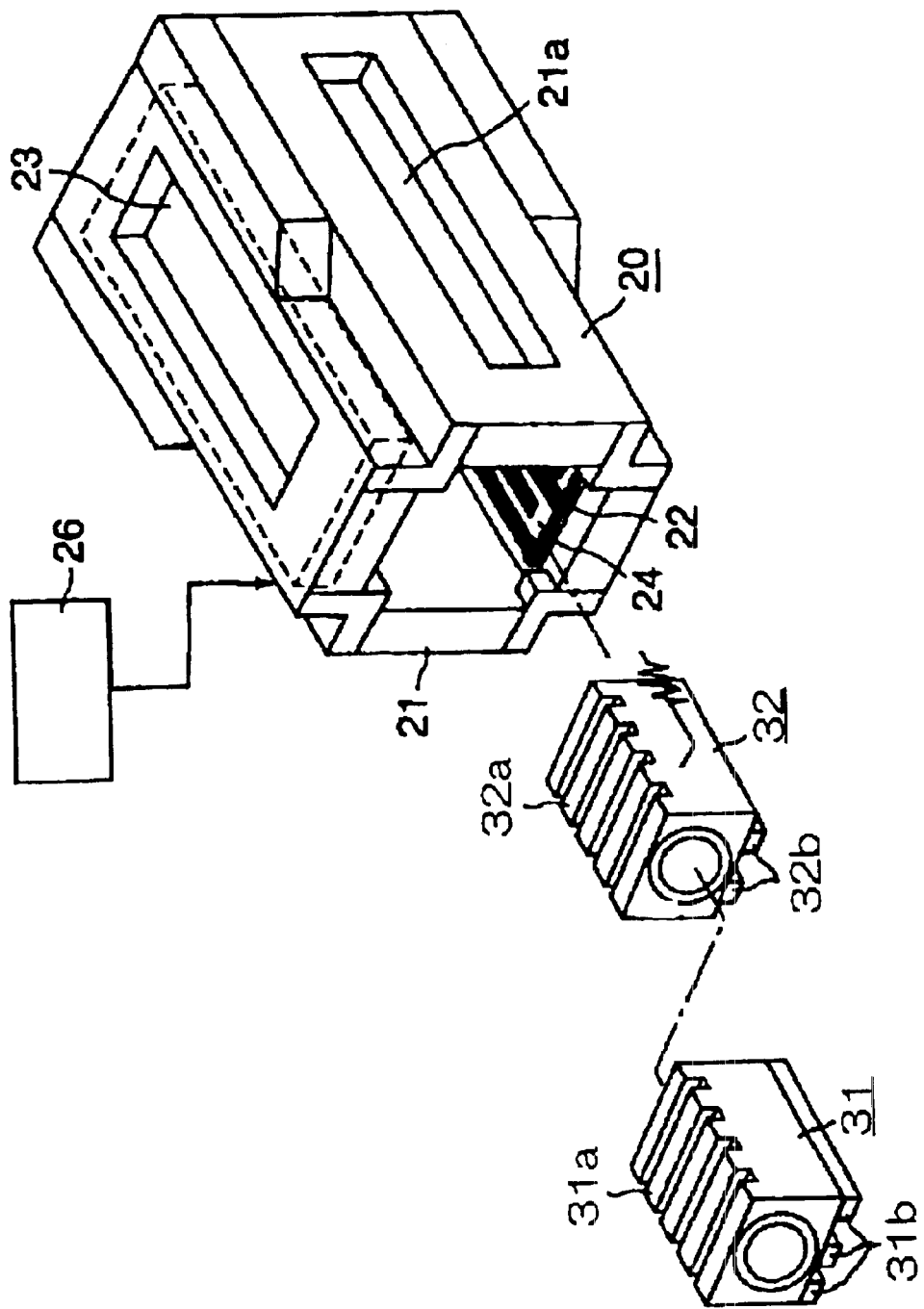
FIG. 18 is a diagram showing an application of a fifth exemplary electrostatic actuator of the present invention used for a lens mechanism in a camera module.
Figure 19A:
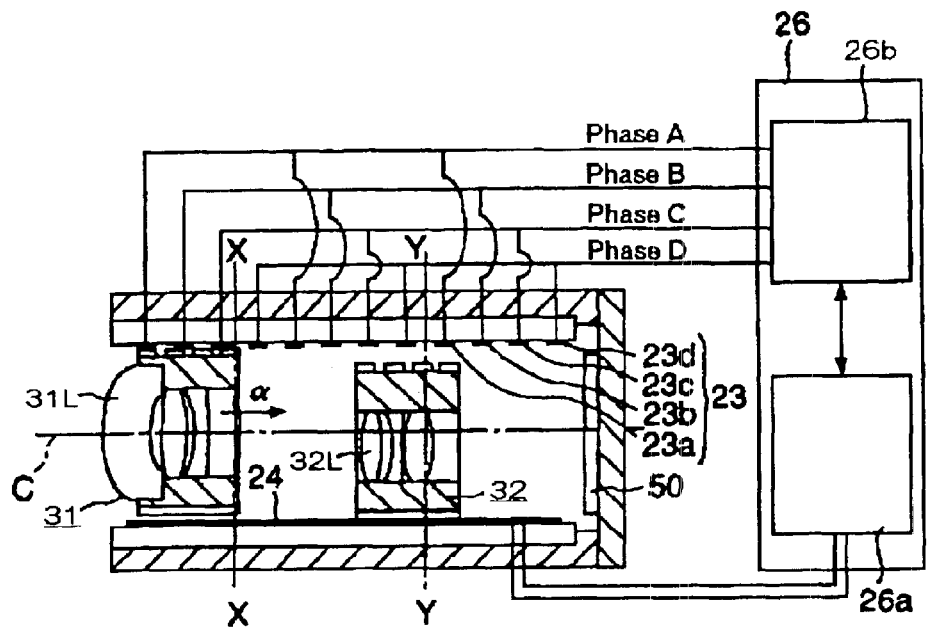
FIGS. 19A through 19C are diagrams showing an application of the fifth exemplary electrostatic actuator of the present invention used for a lens mechanism in a camera module, where
Figures 19B, 19C:
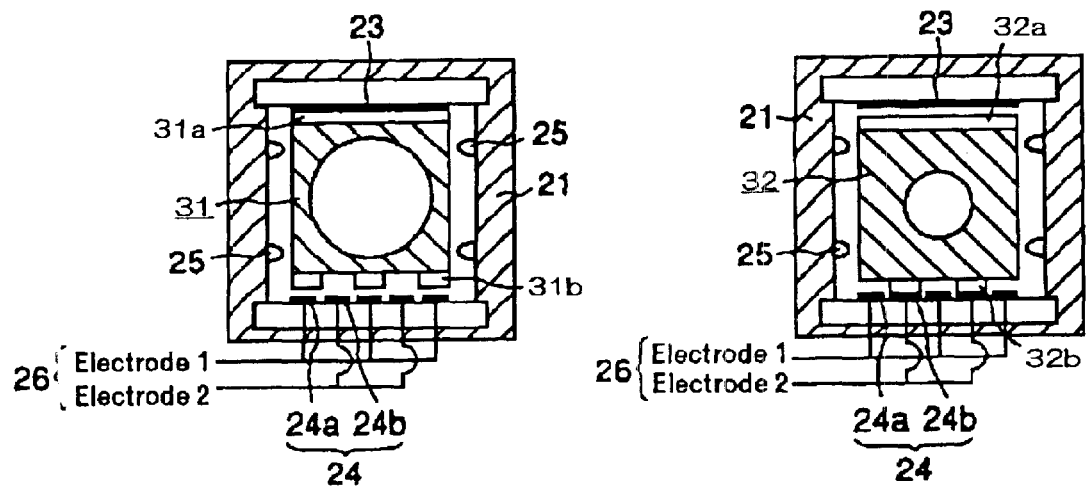

FIGS. 18 through 19C are schematic views showing an application of the exemplary electrostatic actuator to a lens mechanism of a camera module.

The lens mechanism includes a cubic hollow statical member 20 and two movable pieces 30 and 40 reciprocally movable along a longitudinal axis of the statical member 20. Additionally, a camera module including the lens mechanism is incorporated with a CCD device 50, which is positioned at one end of the statical member 20 to detect an image. A lens is depicted in alignment with the optical axis.

The statical member 20 has a frame 20, an electrode 22 patterned in a glass substrate through semiconductor processing technology and connected to the statical member, projections 25 extending in a direction C parallel to the optical axis within the frame 21, and a power supply 26 for the electrode 22.

The statical electrode 22 has groups of activating electrodes 23 and groups of lower electrodes 24.

The activating electrodes 23 include four groups of activating electrodes 23a to 23d, one electrode from each group is alternately positioned in series in the direction C. The activating electrodes 23a to 23d are deployed in stripes perpendicular to the direction C. The number of the groups of the activating electrodes 23 is not limited to four, but there may be three of the groups, or even five or more of the groups of the activating electrodes.

On the other hand, there are two groups of the lower electrodes 24a and 24b, and they are deployed in stripes in the direction C parallel to the optical axis.

The power supply 26 includes a power supply circuit 26a and a switching circuit 26b. The power supply circuit 26a selectively applies voltage to the two groups 24 of the lower electrodes 24a and 24b to hold one of the movable pieces 31 and 32 as a standby and inhibit it from moving in the direction C.

The switching circuit 26b applies voltage alternately to the activating electrodes 23a to 23d and the lower electrodes 23a and 24b other than the satndbys and succeedingly switches the destination of voltage supply among the activating electrodes 23a to 23d in order.

Application of voltage to the electrodes is carried out at the timing as mentioned above in conjunction with the first to fourth embodiments of the present invention. Simultaneous with application of voltage to the lower electrodes 24a and 24b, specific ones of the activating electrodes 23a to 23d are necessarily supplied with voltage, and the movable pieces 31 and 32 are activated while keeping continuously attracted and almost fitted onto the activating electrodes 23.

The movable piece 31 includes a group of lenses 31L supported by a body of the movable piece, passive electrodes 31 affected by activation force derived from the voltage at the electrode 22, and electrodes 31b.

A plurality of the passive electrodes 31a are deployed in stripes in a direction perpendicular to the optical axis or the direction C. The electrodes 31b face the lower electrodes 24a and are deployed in stripes in the direction C parallel to the optical axis.

The movable piece 32 includes a group of lenses 32L supported by the body of the movable piece, passive electrodes 32a affected by activation force derived from the voltage at the electrode 22, and electrodes 32b.

The passive electrodes 32b are deployed in stripes perpendicular to the optical axis or the direction C. The electrodes 32b face the lower electrodes 24b and are deployed in stripes in the direction C parallel to the optical axis.

The lens mechanism configured in this manner works in a fashion as described below. For simplification, herein, a case where only the movable piece 31 is moved in a direction designated by an arrow α in FIG. 19A. FIG. 19A shows the movable piece 31 being in its initial position. The sequence of activating the movable piece follows the timing illustrated in FIG. 3.

When the switching circuit 26b applies voltage V to the activating electrodes 23a and 23b, electrostatic force and attractive force are developed between the activating electrodes and the passive electrode 31a of the movable piece 31 and between those electrodes and the passive electrode 32a of the movable piece 32. The attractive force derived from the activating electrodes 23a and 23b causes the first and second movable pieces 31 and 32 toward the activating electrodes 23 on the statical member 20.

The switching circuit 26b turns the voltage at the activating electrode 23a to low, and simultaneously apply voltage to the lower electrodes 24a and 24b. The movable pieces 31 and 32, while keeping continuously attracted and almost fitted onto the activating electrodes, slightly moves toward lateral directions due to downward attractive force in the plane of FIGS. 19A through 19C.

Continually supplying the lower electrode 24b with voltage through the power supply circuit 26a enables the movable piece 32 to stay in its initial position. At this time, determining a level of the voltage applied to the lower electrode 24b to be higher than that for activating the movable piece 32, it is ensured that the lower electrode 24b can securely hold the movable piece 32.

Then, the activating electrodes 23b and 23c are supplied with voltage through the switching circuit 26b, and subsequently, the activating electrode 23b is turned to low while the lower electrode 24a is supplied with voltage.

Applying voltage to the electrodes following the timing pattern as illustrated in FIG. 3 permits the movable piece 31 to move in a direction α denoted in an arrow while keeping attracted and almost fitted onto the activating electrodes 23.

Since the power supply circuit 26a keep supplying the lower electrode 24b with voltage, the movable piece 32 is securely held in its initial position without moving.

In this way, the switching circuit 26b applies voltage alternately to the activating electrodes 23a to 23d of the electrode groups 23 and the lower electrode 24a of the electrode groups 24, and the order of voltage supply is appropriately determined among the electrodes and electrode groups. Thus, the movable piece 31 can advance in the direction C, and with the power supply circuit 26a continually supplying the lower electrodes 24b with voltage, the movable piece 32 can be secured in a fixed position.

When only the movable piece 32 is to be moved, the switching circuit 26b applies voltage alternately to the activating electrodes 23a to 23d of the electrode groups 23 and the lower electrodes 23b. In this way, the similar operation of the components can be attained, and with the power supply circuit 26a continually supplying the lower electrodes 24b with voltage, the movable piece 31 can be secured in its initial position.

In any case, when the movable piece need to be fixed in position, voltage higher than that is required to move the movable piece should be applied to the lower electrodes 24a and 24b. In this way, it is ensured that the movable piece can securely be held.

In this embodiment, also, in order to avoid useless vertical vibration of the movable piece 31 when the movable piece 31 is to be activated, the voltage applied to the activating electrodes 23a to 23d and that applied to the lower electrodes 24a should be appropriately adjusted as in the aforementioned second embodiment. Alternatively, as described in conjunction with the third embodiment, a rate of areas of the activating electrodes 23a to 23d to the lower electrode 24a may be appropriately varied to get the desired balanced state.

The statical member 20 is provided with the projections 25 to reduce "idling" or "clattering" during the activation of the movable pieces 31 and 32, and the projections are in line contact with the movable pieces 31 and 32. Thus, the projections 25 serve as line contact supports for the movable pieces 31 and 32.

According to the embodiment of the present invention, following the operation sequence as aforementioned in conjunction with the first to fourth embodiments, the movable pieces 31 and 32 can be moved in parallel with the optical axis while keeping continuously attracted and almost fitted onto the activating electrodes 23. As a result, undesired vertical vibration of the movable pieces 31 and 32 can be avoided, and frictional resistance caused by a contact of the movable pieces 31 and 32 with the projections 25 can be considerably reduced. Thus, an activation efficiency can be enhanced.

As has been described, in the lens mechanism incorporated with the electrostatic actuator according to the embodiment of the present invention, the plurality of the movable pieces 31 and 32, which hold an array of the groups of lenses, can be selectively moved, and thus, an actuator design having a zooming feature of lens driving mechanism can be implemented.

Frictional resistance caused between the statical member 20 and the movable pieces 31 and 32 can be considerably reduced, and hence, an operation efficiency can be enhanced.

Although, in the above mentioned embodiment, that which includes two movable pieces has been described, the invention is not limited to this, but an actuator having three of the movable pieces can be similarly configured and obtain the same effects.

In this way, providing the lower electrodes dedicated to their respective movable pieces, and appropriately applying voltage, selected one of the movable pieces can be held in a fixed position while only the remaining can be moved in parallel with the optical axis.

This embodiment can be applied not only to the lens mechanism but also to a variety of mechanisms where a plurality of movable pieces are to be moved independent from each other.

(Sixth Embodiment)

A sixth embodiment will now be described, which is a compact camera module which may have any of the first to fifth embodiments of the electrostatic actuator built in.

The electrostatic actuator according to the present invention is excellent in activation property, and therefore, it is suitable for use in focusing and/or zooming mechanism in a compact camera.

Figure 20:
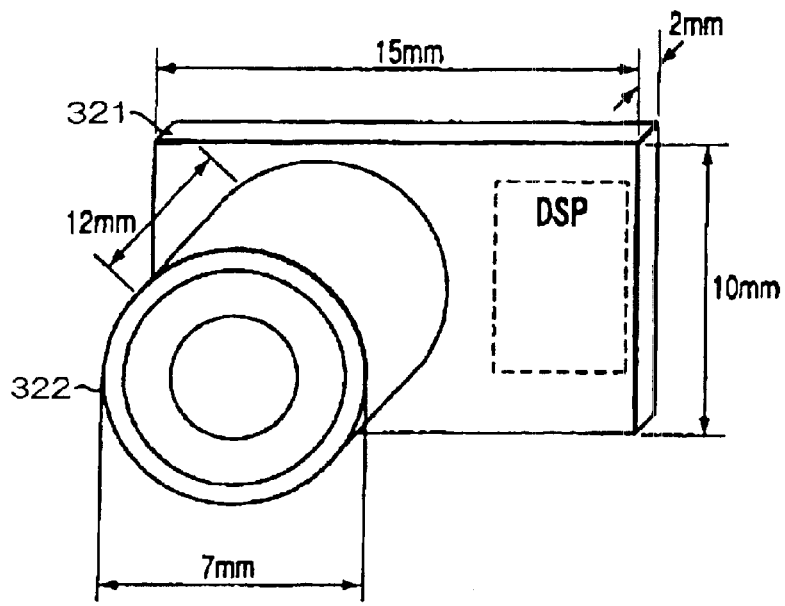
FIG. 20 is a diagram showing a part of a compact camera module incorporated with the electrostatic actuator of the embodiment of the present invention.

FIG. 20 is a schematic diagram illustrating a compact camera module which have the electrostatic actuator of the embodiment of the present invention built in. In the compact camera in FIG. 20, there is an imaging device such as CMOS, CCD, or the like on a substrate 321, and the electrostatic actuator 322 such as any of the first to fifth embodiments of the present invention is positioned right in front of the imaging device.

The movable piece of the electrostatic actuator may be integrated with lens as has been described in conjunction with the fourth embodiment. An IC of DSP (digital signal processor) is mounted on the substrate 321 to control operation of the electrostatic actuator.

Such a camera module is used as a camera unit which is compatible with cellar phone, digital camera, portable PC, and the like.

With any of the first to fifth embodiments of the electrostatic actuator built in, the compact camera module can have additional features of ensured and stable focusing and zooming, and it performance can be enhanced.

For a zooming optical system, at least two groups of movable lens are required. In a compact zooming optical system of reduced dimension in a direction of the optical axis, an optical magnification is often varied in a stepwise manner where after the lens groups are separated from each other, they are moved in position proximal to each other and then separated again. In accordance with the present invention, the electrostatic actuator as described in relation with the fifth embodiment is used to independently move the two groups of lenses along the optical axis. Such an optical system can be implemented in an extremely compact design, and reliable and smooth operation can be ensured.

Although some embodiments of the present invention have been described with reference to the accompanying drawings, it is not intended that the invention should be limited to the precise form of them.

For example, the number of the groups of the activating electrodes incorporated in the electrostatic actuator is not limited to four like A to D, or three lie A to C, unlike the description in the above, but there may be five or more groups of the activating electrodes.

The polarity of the applied voltage to the electrodes also should not be limited to those which have been described in each embodiment, but it is important that a predetermined level of voltage may be applied between the activating electrodes and the movable piece, and between the lower electrodes and the movable piece(s) so as to obtain a predetermined level of electrostatic force required to attract a movable piece as desired.

The timing according to which the voltage is applied to the electrodes should also not be limited to those which have been described in each embodiment, but voltage may simply be applied to the activating electrodes simultaneous with an application of voltage to the lower electrodes.

Figure 21:
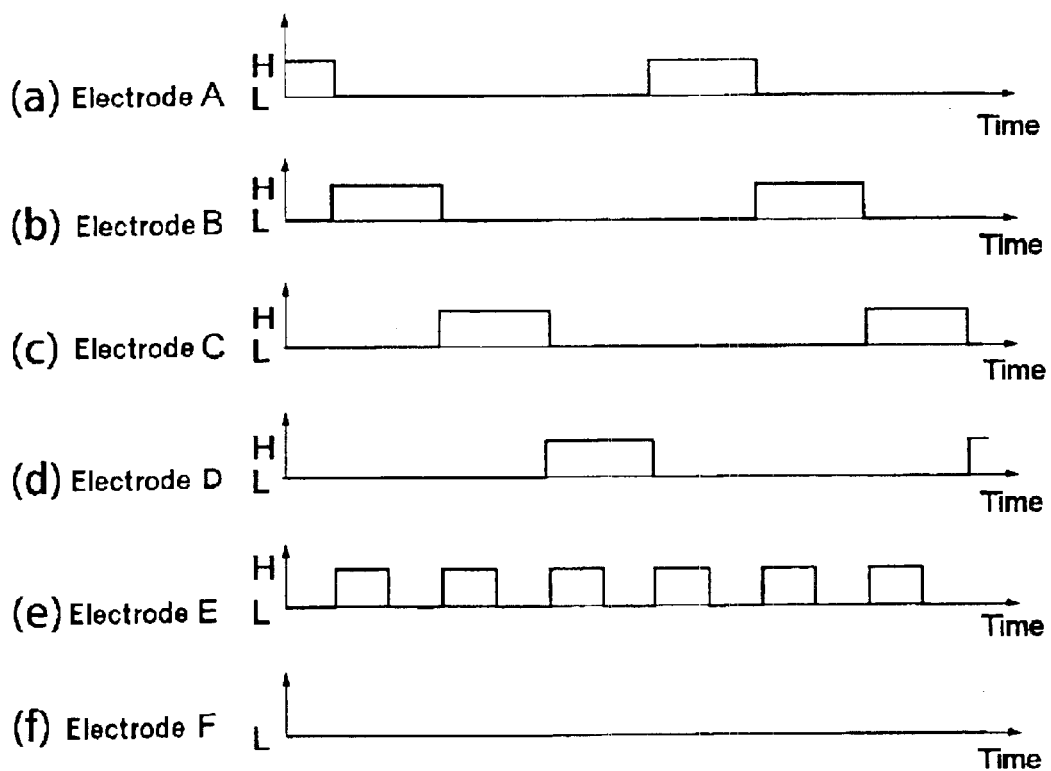
FIGS. 21 through 23 are timing charts illustrating other examples of the timing possibly used for the embodiment of the present invention.
Figure 22:
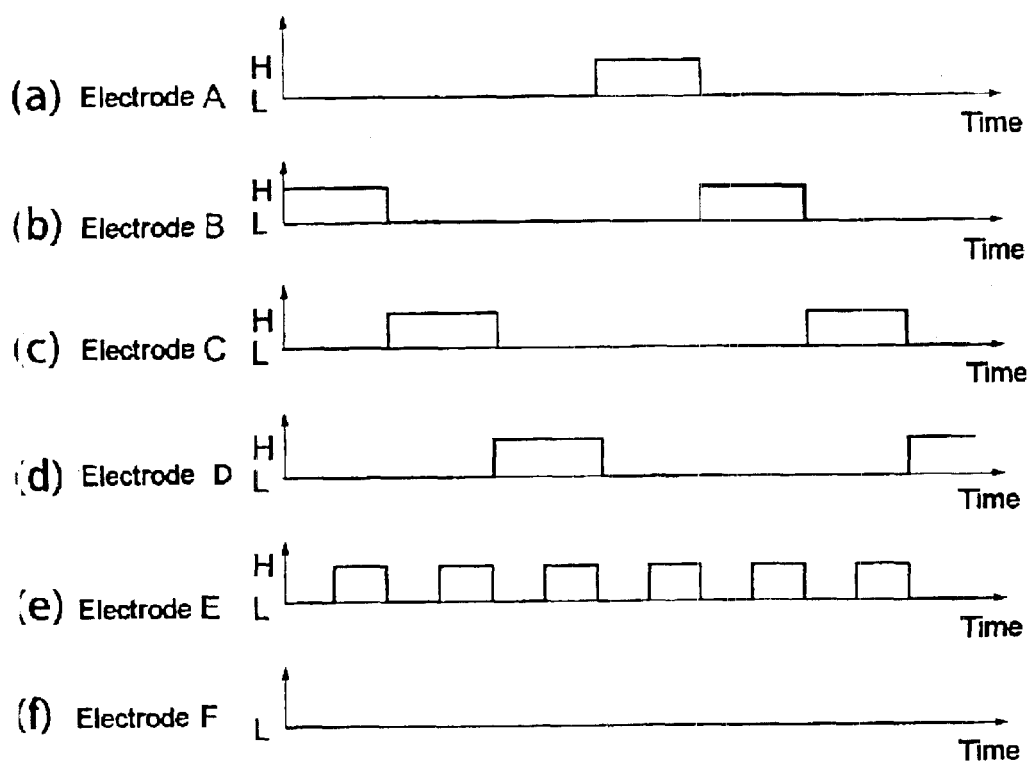
Figure 23:
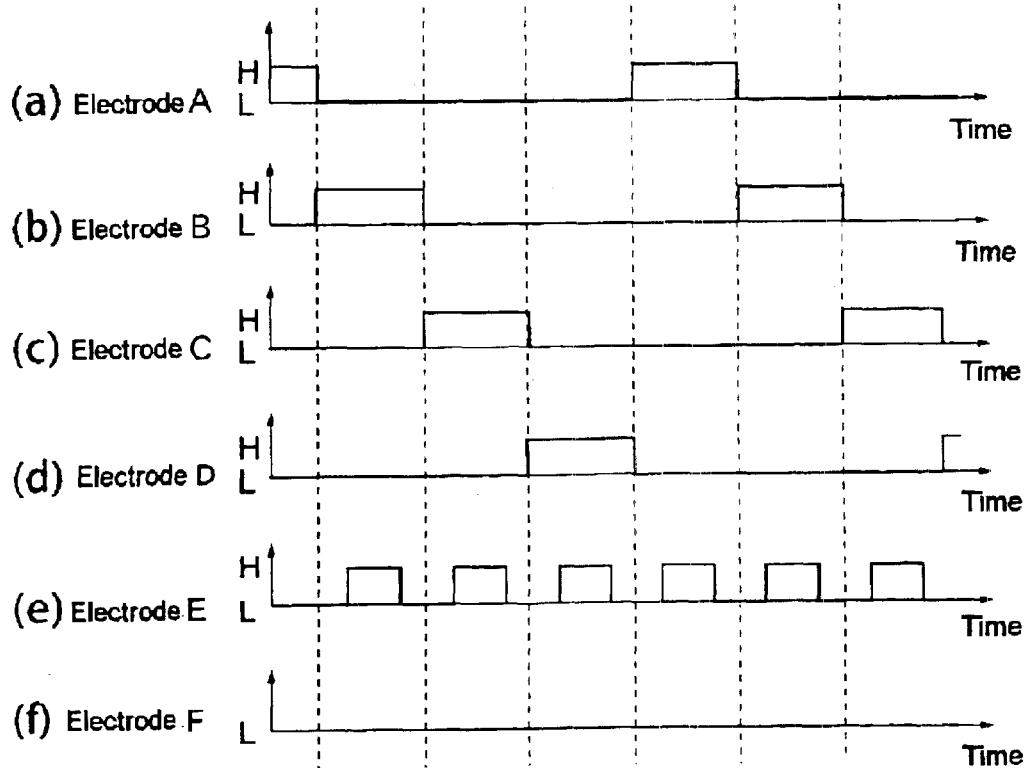

FIGS. 21 to 23 are timing charts representing sample timings that can be used in the embodiment of the present invention. These are all designed for an application where four groups of the activating electrodes A to D and the lower electrode E are incorporated.

The timing charts shown in FIG. 3 and FIG. 15 are based upon a sequence where adjacent ones of the groups of the activating electrodes (e.g., A and B, or B and C) would be supplied with voltage when voltage is not applied to the lower electrodes.

The present invention should not be limited to those described above, but alternatively, the sequence may be for an operation design where only one group of the activating electrodes would be supplied with voltage when voltage is not applied to the lower electrode.

As to the sequence shown in FIG. 21, after the electrode A is supplied with voltage at time t1, the electrode A is turned to low in voltage level, at time t2, while the electrode B and the lower electrode E with voltage. Further, subsequently, at time t3, while the electrode maintains its voltage level unchanged, the lower electrode E is turned to low in voltage level.

After that, succeedingly applying voltage to the activating electrodes A to D in order, the movable piece can be activated while keeping continuously attracted and almost fitted onto the activating electrodes.

Also, in such a case, as mentioned above in relation with the second to third embodiments, applied voltage to the activating electrodes and the lower electrode(s) and a rate of areas among electrodes are appropriately adjusted to assuredly restrain vertical vibration of the movable piece.

In the sequence illustrated in FIG. 22, after the electrode B is supplied with voltage at time t1, the electrode B maintains its voltage level unchanged while the lower electrode E is supplied with voltage, at time t2. Subsequently, at time t3, the electrode B and the lower electrode E are turned to low in voltage level while voltage is applied to the electrode C.

After that, succeedingly applying voltage to the electrodes in order, the movable piece can be activated while keeping continuously attracted and almost fitted onto the activating electrodes.

As to the sequence illustrated in FIG. 23, there is a "time delay" inserted in the timing for the activating electrodes A to D and the timing for the lower electrode E. Voltage is applied to the activating electrodes A to D, respectively, in two successive timing units in order, and when voltage is applied to the lower electrode in only a single timing unit, the time delay is inserted in accord with each rising time of every application of voltage to the remaining electrodes. Thus, the activating electrodes and the lower electrode(s) would never be supplied with voltage simultaneously, nor never be turned to low simultaneously.

In this way, even during a transition of applied voltage to the lower electrode E, the activating electrodes continuously keep supplied with constant voltage, and therefore, "chattering" or "ripple" that may be caused by simultaneous application of voltage to the upper and lower electrodes or by interruption of the application of voltage can be effectively suppressed.

As has been described in detail, in accordance with the embodiment of the present invention, supplying the lower electrode with voltage simultaneous with application of voltage to the activating electrodes, the movable piece can laterally advance while continuously keeping attracted and almost fitted onto the activating electrodes.

Consequently, undesired vertical vibration of the movable piece can be restrained, and this attains almost the same effect of reduced clearance between the movable piece and the statical member, so that development of force exerted between those components can be facilitated. Since the clearance between the activating electrodes and the movable piece can always keep minimized, strong and stable attracting force or Coulomb force can be developed. Moreover, a highly refined electrostatic actuator of reliable and stable operation can be attained, and this will be lot of benefit to the industry.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A camera module comprising:
   an imaging device;
   an electrostatic actuator including:
      a first statical member having an electrode array comprising at least three groups of activating electrodes periodically deployed in a first direction,
      a second statical member facing the first statical member and having an electrode extending in the first direction,
      a movable piece provided between the first and second statical members, and
      a switching circuit configured to apply a first voltage between at least one of the at least three groups of activating electrodes of the first statical member and the movable piece and also configured to apply a second voltage between the electrode of the second statical member and the movable piece, the first voltage being applied sequentially to each of the at least three groups of activating electrodes in the first direction, the second voltage being intermittently applied while the first voltage is applied, wherein
   a potential difference caused by applying the first voltage between the activating electrodes of the first statical member and the movable piece is larger than a potential difference caused by applying the second voltage between the electrode of the second statical member and the movable piece; and
   a lens mounted on the movable piece of the electrostatic actuator and configured to input optical information to the imaging device.

2. The camera module of claim 1, wherein when the first voltage is applied to at least one of the at least three groups of activating electrodes and the second voltage is applied to the electrode of the second statical member, a face-to-face area of the at least one of the at least three groups of activating electrodes and the movable piece is larger than a face-to-face area of the electrode of the second statical member and the movable piece.

3. The camera module of claim 1, wherein when applying the second voltage, the switching circuit applies a voltage of a polarity reversed to that of the first voltage to at least one of the at least three groups of activating electrodes to which the first voltage is not applied.

4. The camera module of claim 1, wherein the switching circuit applies a voltage so that a first condition and a second condition are alternatively repeated, the first condition being that a potential of each group of activating electrodes is higher than a potential of the movable piece, the second condition being that a potential of each group of activating electrodes is lower than a potential of the movable piece.

5. The camera module of claim 1, wherein the first voltage is applied to cause a potential difference between at least two adjacent groups of the at least three groups of activating electrodes and the movable piece.

6. The camera module of claim 1, wherein a pulse time width during which the switching circuit applies the first voltage is longer than a pulse time width during which the switching circuit applies the second voltage.

7. The camera module of claim 1, wherein the switching circuit starts applying the first voltage prior to applying the second voltage, and the switching circuit stops applying the first voltage after stopping to apply the second voltage.

8. The camera module of claim 1, further comprising a stopper positioned between the first statical member and the movable piece.

9. A camera module comprising:
   an imaging device;
   an electrostatic actuator including:
      a first statical member having an electrode array comprising at least three groups of activating electrodes periodically deployed in a first direction,
      a second statical member facing the first statical member and having a first electrode extending in the first direction and a second electrode extending in the first direction almost parallel to the first electrode,
      a first movable piece provided between the first and second statical members,
      a second movable piece provided between the first and second statical members, and
      a switching circuit configured to apply (i) a first voltage between at least one of the at least three groups of activating electrodes and the first movable piece, (ii) a second voltage between the first electrode and the first movable piece, the first voltage being applied to sequentially switch each of the at least three groups of activating electrodes in the first direction, and the second voltage being intermittently applied while the first voltage is applied, (iii) a third voltage between at least one of the at least three groups of activating electrodes and the second movable piece, and (iv) a fourth voltage between the second electrode and the second movable piece, the third voltage being applied to sequentially switch each group of the at least three groups of activating electrodes in the first direction, and the fourth voltage being intermittently applied while the third voltage is applied;
   a lens mounted on the first movable piece of the electrostatic actuator and configured to input optical information to the imaging device; and a lens mounted on the second movable piece of the electrostatic actuator and configured to input optical information to the imaging device.

10. The camera module of claim 9, wherein a potential difference caused by applying the first voltage between at least one of the at least three groups of activating electrodes and the first movable piece is larger than a potential difference caused by applying the second voltage between the first electrode and the first movable piece, and a potential difference caused by applying the third voltage between at least one of the at least three groups of activating electrodes and the second movable piece is larger than a potential difference caused by applying the fourth voltage between the second electrode and the second movable piece.

11. The camera module of claim 9, wherein when the first voltage is applied to at least one of the at least three groups of activating electrodes and the second voltage is applied to the first electrode, a face-to-face area of the at least one of the at least three groups of activating electrodes and the first movable piece is larger than a face-to-face area of the first electrode and the first movable piece, and when the third voltage is applied to at least one of the at least three groups of activating electrodes and the second voltage is applied to the second electrode, a face-to-face area of the at least one of the at least three groups of activating electrodes and the second movable piece is larger than a face-to-face area of the second electrode and the second movable piece.

12. The camera module of claim 9, further comprising a power supply circuit configured to apply a fifth voltage to the first electrode and the first movable piece to cause a potential difference larger than by applying the second voltage, wherein while the first movable piece can be held at a fixed position, the second movable piece can be advanced.

13. The camera module of claim 9, wherein the first and third voltages are applied to cause a potential difference between at least two adjacent groups of the at least three groups of activating electrodes and the first and second movable pieces, respectively.

14. The camera module of claim 9, wherein a pulse time width during which the switching circuit applies the first and third voltages is longer than a pulse time width during which the switching circuit applies the second and fourth voltages to the first and the second electrodes, respectively.

15. The camera module of claim 9, wherein the switching circuit starts applying the first and third voltages prior to applying the second and fourth voltages, and the switching circuit stops applying the first and third voltages after stopping to apply the second and fourth voltages.

16. The camera module of claim 9, further comprising a stopper positioned between the first statical member and the first and second movable pieces.

17. The camera module of claim 9, wherein the first voltage and the third voltage are identical, and the second voltage and the fourth voltage are identical.

* * * * *